United States Patent
Suzuki et al.

(10) Patent No.: US 7,758,983 B2
(45) Date of Patent: Jul. 20, 2010

(54) FUEL CELL DISASSEMBLY METHOD AND FUEL CELL

(75) Inventors: Hiroshi Suzuki, Nishikamo-gun (JP); Go Tejima, Toyota (JP); Tomoaki Nakashima, Toyota (JP); Ryo Akagawa, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 565 days.

(21) Appl. No.: 10/584,342

(22) PCT Filed: Dec. 24, 2004

(86) PCT No.: PCT/JP2004/019787

§ 371 (c)(1),
(2), (4) Date: Jun. 23, 2006

(87) PCT Pub. No.: WO2005/064726

PCT Pub. Date: Jul. 14, 2005

(65) Prior Publication Data

US 2007/0082250 A1    Apr. 12, 2007

(30) Foreign Application Priority Data

Dec. 26, 2003  (JP)  .............................. 2003-433266
Dec. 2, 2004   (JP)  .............................. 2004-349941

(51) Int. Cl.
*H01M 8/00*  (2006.01)
*H01M 2/08*  (2006.01)

(52) U.S. Cl. .......................................... 429/12; 429/35

(58) Field of Classification Search ................... 429/35, 429/49
See application file for complete search history.

(56) References Cited

U.S. PATENT DOCUMENTS 5,718,984 A * 2/1998 Iwase et al. .................... 429/49
6,020,083 A * 2/2000 Breault et al. ................. 429/36

(Continued)

FOREIGN PATENT DOCUMENTS

EP          0110517 A1    6/1984

(Continued)

*Primary Examiner*—Dah-Wei D Yuan
*Assistant Examiner*—Adam A Arciero
(74) *Attorney, Agent, or Firm*—Oliff & Berridge, PLC

(57) ABSTRACT

A process of disassembling a fuel cell 10 supplies a fluid to both a fuel gas conduit 6g and an oxidizing gas conduit 7g. Since outlets of the respective gas conduits 6g and 7g are shielded, the internal pressure or in-passage pressure of the respective gas conduits 6g and 7g gradually rises and eventually exceeds a specific in-passage pressure level for power generation of the fuel cell 10. The high in-passage pressure expands a gas diffusion electrode 4b of a membrane electrode assembly (MEA) 2 and a separator 6, which define the fuel gas conduit 6g, in opposite directions to make a clearance between the gas diffusion electrode 4b and the separator 6. Similarly the high in-passage pressure expands a gas diffusion electrode 5b of the MEA 2 and a separator 7, which define the oxidizing gas conduit 7g, in opposite directions to make a clearance between the gas diffusion electrode 5b and the separator 7. The supplied fluid then flows out through these clearances into seals between the separators 6 and 7 and the MEA 2. These flows raise the in-passage pressure and release the seals.

17 Claims, 16 Drawing Sheets

← : FLOW OF FLUID

U.S. PATENT DOCUMENTS

| | | |
|---|---|---|
| 6,610,435 B1 | 8/2003 | Maruyama et al. |
| 2001/0021470 A1* | 9/2001 | May et al. .................... 429/44 |

FOREIGN PATENT DOCUMENTS

| | | |
|---|---|---|
| JP | A 8-171922 | 7/1996 |
| JP | A 8-329959 | 12/1996 |
| JP | A 10-321247 | 12/1998 |
| JP | A 11-016594 | 1/1999 |
| JP | A 11-288732 | 10/1999 |
| JP | 2000-093932 A | 4/2000 |
| JP | A 2000-164228 | 6/2000 |
| JP | 2001-332282 A | 11/2001 |
| JP | A 2002-025581 | 1/2002 |
| JP | A 2002-151112 | 5/2002 |
| WO | WO 02/091513 A1 | 11/2002 |
| WO | WO 2004/066425 A2 | 8/2004 |
| WO | WO 2005/045969 A2 | 5/2005 |

* cited by examiner

← : FLOW OF FLUID

Fig. 5
(a)
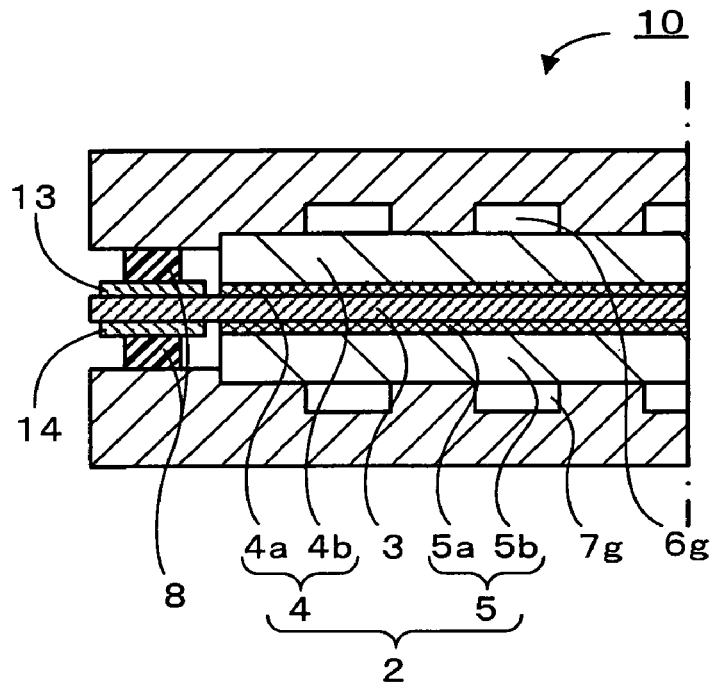
(b)
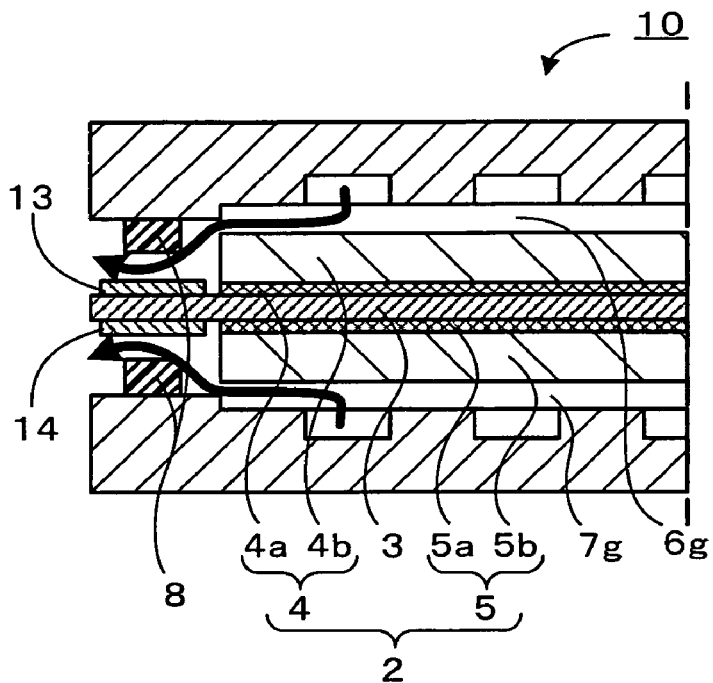
← : FLOW OF FLUID

Fig. 6
(a)
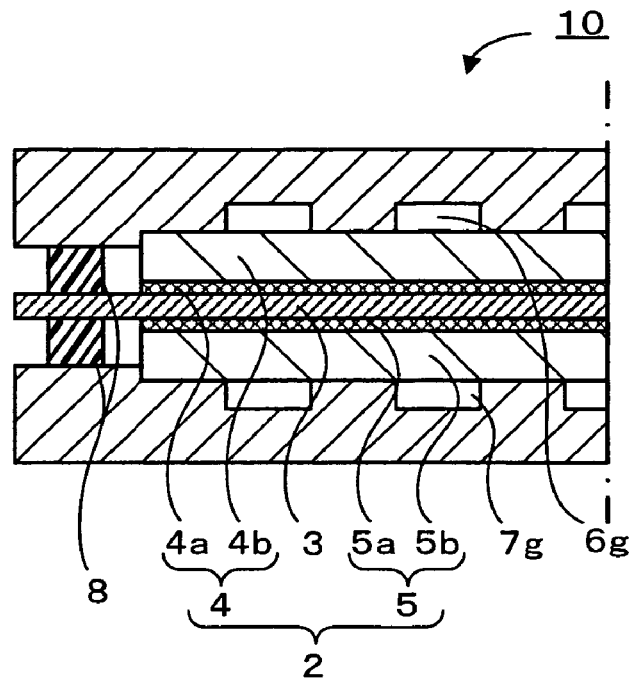
(b)
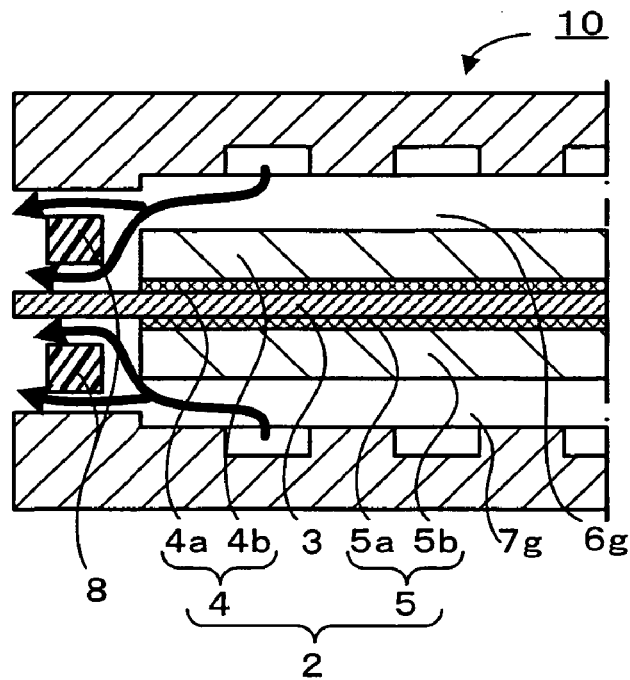
← : FLOW OF FLUID

Fig. 10
(a)
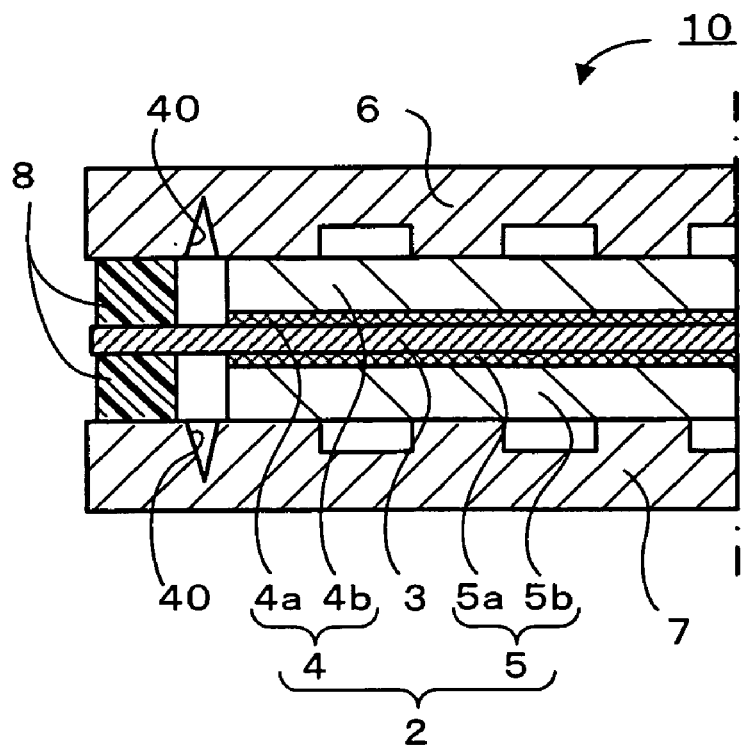
(b)
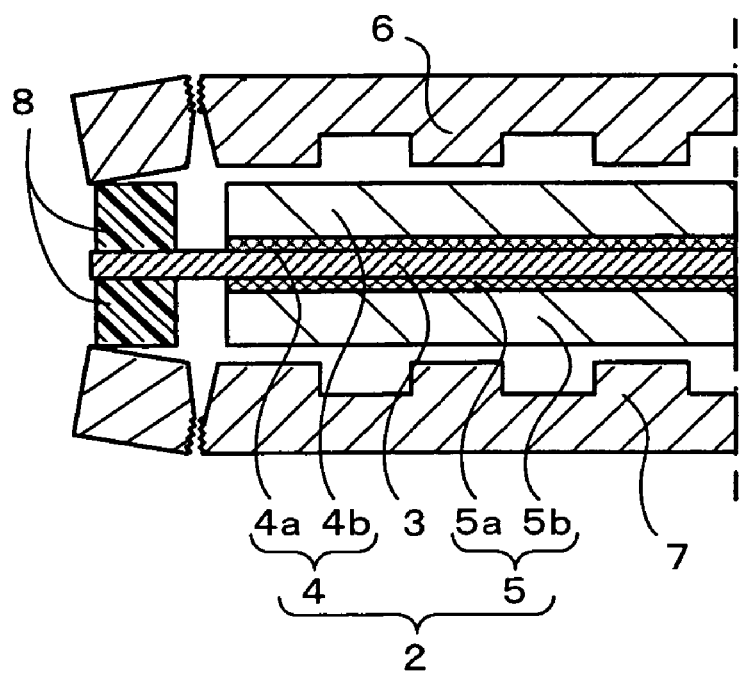

FUEL CELL DISASSEMBLY METHOD AND FUEL CELL

TECHNICAL FIELD

The present invention relates to a fuel cell disassembly method and a fuel cell.

BACKGROUND ART

A fuel cell of a known structure includes: an electrode assembly that has an electrolyte interposed between a pair of electrodes; sealing layers that are formed along periphery of the electrode assembly; and a pair of separators that are arranged across the electrode assembly and bonded to the sealing layers, where one of the separators facing one of the electrodes has an oxidizing gas conduit, while the other of the separators facing the other of the electrodes has a fuel gas conduit. In the fuel cell of this known structure, a supply of hydrogen is fed as a fuel gas to the fuel gas conduit, whereas a supply of the air is fed as an oxidizing gas to the oxidizing gas conduit. Hydrogen is separated into proton and electron at one of the electrodes (anode) facing the fuel gas conduit. The proton passes through the electrolyte and shifts to the other electrode (cathode), while the electron runs through an external circuit and shifts to the cathode. Oxygen included in the air reacts with the proton and the electron to produce water at the cathode. This electrochemical reaction generates an electromotive force. The sealing layer is an adhesive layer for bonding the two separators to each other and functions to prevent direct contact of oxygen with hydrogen on the peripheries of the respective electrodes.

Disassembly of the fuel cell is often required for recovery and recycle of the expensive electrode assembly (especially the electrodes containing noble metal catalysts) from the used fuel cell, for separated collection or disposal of the used fuel cell, and for evaluation of the performance of the electrode assembly in the used fuel cell. For example, a fuel cell disclosed in Japanese Patent Laid-Open Gazette No. 2002-151112 has a linear member placed between sealing layers and a separator. The linear member is pulled out to peel off the sealing layers for disassembly of the fuel cell.

In the structure of this prior art fuel cell, however, when the linear member is tightly stuck to the sealing layers, the pulling action of the linear member outward may not move the linear member sufficiently or may destroy the linear member. The sealing layers may thus not be peeled off successfully. This structure accordingly does not ensure effective and efficient disassembly of the fuel cell. There is another demand of disassembling a layered body of multiple fuel cells in units of individual fuel cells to allow local replacement of only deteriorating fuel cells. The cited reference does not have any description on this point.

DISCLOSURE OF THE INVENTION

The object of the present invention is to provide a disassembly method that attains adequate disassembly of the fuel cell according to requirements. The object of the present invention is further to provide a fuel cell to which the disassembly method is applied.

In order to attain at least part of the above and the other related objects, the present invention is directed to a fuel cell disassembly method of disassembling a fuel cell. The fuel cell includes: an electrode assembly having an electrolyte interposed between a pair of electrodes; sealing layers located to surround periphery of the electrode assembly; and a pair of separators arranged across the electrode assembly and bonded to the sealing layers, where one of the separators facing one of the electrodes has a fuel gas conduit, while the other of the separators facing the other of the electrodes has an oxidizing gas conduit. The fuel cell disassembly method has the step of providing a fluid supply for disassembly of the fuel cell to facilitate disassembly of the fuel cell.

The fuel cell disassembly method of this invention provides the fluid supply for disassembly of the fuel cell to facilitate disassembly of the fuel cell. When the fluid supply for disassembly of the fuel cell does not give a sufficient power to detach the separators, the operator applies an external force directly or via an adequate jig to accomplish detachment of the separators. The lowered adhesion force by the fluid supply for disassembly of the fuel cell facilitates detachment of the separators from the fuel cell of this structure, compared with the cited structure of the prior art fuel cell (see Japanese Patent Laid-Open Gazette No. 2002-151112). When the fluid supply for disassembly of the fuel cell gives a sufficient power for detachment of the separators, on the other hand, no such additional release operation is required. The fuel cell disassembly method of the invention ensures easy disassembly of the fuel cell according to the requirements.

It is preferable to provide the fluid supply for disassembly of the fuel cell to adjoining constituents of the fuel cell. Here the step of facilitating disassembly of the fuel cell may be any step of assisting disassembly of the fuel cell, for example, releasing the sealing layers from the separators, releasing the sealing layers from the electrode assembly, lowering an adhesion force between the sealing layers and the separators, lowering an adhesion force between the sealing layers and the electrode assembly, and providing a breaking guide (for example, a groove) formed in the inner face of each separator to break the separator from the breaking guide as a starting point. The sealing layers have the function of sealing a clearance between the pair of separators and may be, for example, an adhesive or gaskets. The adhesive or gaskets may be made of, for example, a fluororesin or a silicone resin.

The principle of the invention is applicable to any types of fuel cells including polymer electrolyte fuel cells, solid oxide fuel cells, molten carbonate fuel cells, phosphoric acid fuel cells, and alkaline fuel cells. It is preferable that the fluid supply for disassembly of the fuel cell has a difference in at least one of the type, the pressure, and the temperature of the fluid from that of the fluid supplied for power generation of the fuel cell.

In one preferable embodiment of the fuel cell disassembly method of the invention, the fluid supply for disassembly of the fuel cell is different from a fluid supply provided for power generation of the fuel cell. For example, the fluid supply for disassembly of the fuel cell may supply a different fluid from a fluid provided for power generation of the fuel cell or may adopt a different feeding method from a feeding method adopted for power generation of the fuel cell.

In one preferable embodiment of the fuel cell disassembly method of the invention, the fluid supply for disassembly of the fuel cell is provided to supply a fluid to at least one of the fuel gas conduit and the oxidizing gas conduit. In the structure that the separator has a coolant conduit for regulation of the temperature of the fuel cell, a fluid (for example, a fluid which is different from the fluid supplied for power generation of the fuel cell) may be supplied to the coolant conduit to facilitate disassembly of the fuel cell.

In another preferable embodiment of the fuel cell disassembly method of the invention, the fluid supply for disassembly of the fuel cell supplies a fluid to heighten an in-passage pressure of at least one of the fuel gas conduit and the oxidizing gas conduit over a level of in-passage pressure in the fluid supply for power generation of the fuel cell. The fluid supply for disassembly of the fuel cell may supply a fluid to repeatedly vary the level of in-passage pressure of the gas conduit, that is, to repeat a process of heightening the in-passage pressure over the level of in-passage pressure in the fluid supply for power generation of the fuel cell and subsequently lowering the in-passage pressure. In either case, the enhanced in-passage pressure in the fluid supply for disassembly of the fuel cell over the level of in-passage pressure in the fluid supply for power generation of the fuel cell gives the force of releasing the separators to disassemble the fuel cell. It is desirable that the separators are kept pressing or surrounding during the fluid supply for disassembly of the fuel cell. This layout effectively prevents the separators released under the high in-passage pressure from being jumped out.

In the fuel cell disassembly method of the invention, it is preferable that the fluid supply for disassembly of the fuel cell supplies a different type of a fluid from a type of a fluid supplied for power generation of the fuel cell. The different type of the fluid preferably has a function of lowering either an adhesion force between the sealing layers and the separators or an adhesion force between the sealing layers and the electrode assembly. The different type of the fluid may be, for example, an organic solvent or a release agent (including a surfactant) that has the function of dissolving or softening boundaries between the sealing layers and the separators or boundaries between the sealing layers and the electrode assembly. Available examples of the organic solvent include alcohols like methanol, ethanol, propanol, and butanol, ketones like acetone and methyl ethyl ketone, and esters like methyl acetate and ethyl acetate. The different type of the fluid may be water (including both hot water and cold water) when a water-absorbing resin is added to the boundaries between the sealing layers and the separators or to the boundaries between the sealing layers and the electrode assembly. The water-absorbing resin absorbs water and is swollen to lower the adhesion force at the boundaries between the sealing layers and the separators or at the boundaries between the sealing layers and the electrode assembly.

In the fuel cell disassembly method of the invention, it is preferable that the fluid supply for disassembly of the fuel cell supplies a fluid having a higher temperature than a temperature of a fluid supplied for power generation of the fuel cell. The temperature of the fluid for disassembly of the fuel cell is desirably set to a level that lowers the adhesion force between the sealing layers and the separators or the adhesion force between the sealing layer and the electrode assembly. When a thermally expandable resin is added to the boundaries between the sealing layers and the separators or to the boundaries between the sealing layers and the electrode assembly, the temperature of the fluid is set to a level that ensures thermal expansion of the thermally expandable resin. The thermal expansion of the thermally expandable resin lowers the adhesion force at the boundaries between the sealing layers and the separators or at the boundaries between the sealing layers and the electrode assembly.

In the fuel cell disassembly method of the invention, it is also preferable that an external force is additionally applied in directions of parting the pair of separators from each other during the fluid supply for disassembly of the fuel cell. Application of the external force to the separators in the mutually parting directions in the course of the fluid supply for disassembly of the fuel cell effectively facilitates detachment of the sealing layers from the separators or from the electrode assembly.

In one preferable embodiment of the invention, the fuel cell disassembly method further has the step of weakening a pressing force applied in a direction of making the pair of separators approach to each other during power generation of the fuel cell, prior to the step of providing the fluid supply for disassembly of the fuel cell. The weakened pressing force relatively enhances the power of separating the pair of separators in the subsequent fluid supply for disassembly of the fuel cell to facilitate disassembly of the fuel cell. The fluid supply for disassembly of the fuel cell may be identical with or different from the fluid supply provided for power generation of the fuel cell.

In the fuel cell disassembly method of the invention, the fluid supply providing step may provide the fluid supply to facilitate disassembly of either a fuel cell stack or a fuel cell module, which is a layered body of plurality of the fuel cells, as well as to facilitate disassembly of a single fuel cell.

The present invention is also directed to a fuel cell disassembly method that disassembles a layered body of multiple fuel cells having a coolant sealing layer, which prevents leakage of a coolant from a coolant conduit formed either between adhesion faces of each pair of adjoining fuel cells or between adhesion faces of each fuel cell and each coolant conduit separator. The fuel cell disassembly method includes the steps of: providing a fluid supply prior to disassembly of the fuel cells of the layered body to the coolant conduit to remove at least part of the coolant from a space between the adhesion faces of each pair of adjoining fuel cells or from a space between the adhesion forces of each fuel cell and each coolant conduit separator; and providing a fluid supply for disassembly of the fuel cells of the layered body to at least either of a fuel gas conduit and an oxidizing gas conduit in the layered body of the fuel cells to facilitate disassembly of at least part of the fuel cells of the layered body.

This method evaporates or blows off at least part of the coolant that is present in the space between the adhesion faces of the adjoining fuel cells or in the space between the adhesion faces of the fuel cell and the coolant conduit separator. This removes at least part of the coolant and thereby lowers the adhesion force between the adhesion faces to facilitate separation of the adhesion faces. The fluid supply may be provided to at least either of the fuel gas conduit and the oxidizing gas conduit in the layered body of the fuel cells to facilitate disassembly of at least part of the fuel cells of the layered body. The fuel cells can thus be readily taken out of the layered body or disassembled according to the requirements. Any of the applications of the fuel cell disassembly method discussed previously may also be adopted for the fuel supply to at least either of the fuel gas conduit and the oxidizing gas conduit in the layered body of the fuel cells to ensure the corresponding effects described above. In the specification hereof, the coolant may be used to warm up cold fuel cells, as well as to cool down hot fuel cells.

The invention is further directed to another fuel cell disassembly method that disassembles a layered body of multiple fuel cells having a coolant sealing layer, which prevents leakage of a coolant from a coolant conduit formed either between adhesion faces of each pair of adjoining fuel cells or between adhesion faces of each fuel cell and each coolant conduit separator. The fuel cell disassembly method includes the step of providing a fluid supply for disassembly of the fuel cells of the layered body to the coolant conduit to remove at least part of the coolant from a space between the adhesion faces of each pair of adjoining fuel cells or from a space between the adhesion forces of each fuel cell and each coolant conduit separator.

This method evaporates or blows off at least part of the coolant that is present in the space between the adhesion faces of the adjoining fuel cells or in the space between the adhesion faces of the fuel cell and the coolant conduit separator. This removes at least part of the coolant and thereby lowers the adhesion force between the adhesion faces to facilitate separation of the adhesion faces. The fuel cells can thus be readily taken out of the layered body or disassembled according to the requirements.

The present invention is also directed to a fuel cell that generates electric power through reaction of a fuel gas with an oxidizing gas. The fuel cell includes: an electrode assembly having an electrolyte interposed between a pair of electrodes; sealing layers located to surround periphery of the electrode assembly; and a pair of separators arranged across the electrode assembly and bonded to the sealing layers, where one of the separators facing one of the electrodes has a fuel gas conduit, while the other of the separators facing the other of the electrodes has an oxidizing gas conduit. At least either boundaries between the sealing layers and the separators or boundaries between the sealing layers and the electrode assembly are made of a functional material having an adhesion force that is lowered by a fluid supply for disassembly of the fuel cell, which is different from a fluid supply for power generation of the fuel cell, to supply a fluid to at least one of the fuel gas conduit and the oxidizing gas conduit.

The adhesion force at least at the boundaries between the sealing layers and the separators or at the boundaries between the sealing layers and the electrode assembly is lowered by the fluid supply for disassembly of the fuel cell, which supplies a different fluid from a fluid supplied for power generation of the fuel cell, to at least one of the fuel gas conduit and the oxidizing gas conduit. The fuel cell of this structure enables the adhesion force to be readily lowered at the boundaries between the sealing layers and the separators or at the boundaries between the sealing layers and the electrode assembly, when a different fluid from a fluid supplied for power generation of the fuel cell is supplied for disassembly of the fuel cell. The structure of the fuel cell thus ensures easy disassembly.

In one preferable embodiment of the fuel cell of the invention, the functional material has a characteristic of lowering the adhesion force in a preset high temperature range. The fluid supply for disassembly of the fuel cell, which is different from the fluid supply for power generation of the fuel cell, is provided in the preset high temperature range to lower the adhesion force at the boundaries between the sealing layers and the separators or at the boundaries between the sealing layers and the electrode assembly. Such temperature regulation thus ensures easy disassembly of the fuel cell. A typical example of this functional material is a mixture of an epoxy sealing material with a water-absorbing resin.

In another preferable embodiment of the fuel cell of the invention, the functional material has a characteristic of lowering the adhesion force, when being exposed to hot water. The fluid supply for disassembly of the fuel cell, which is different from the fluid supply for power generation of the fuel cell, supplies a flow of hot water to lower the adhesion force at the boundaries between the sealing layers and the separators or at the boundaries between the sealing layers and the electrode assembly. This arrangement ensures easy disassembly of the fuel cell. A typical example of this functional material is a mixture of an epoxy sealing material with a water-absorbing resin.

In still another preferable embodiment of the fuel cell of the invention, the functional material has a characteristic of lowering the adhesion force, when being exposed to an organic solvent or a release agent. The fluid supply for disassembly of the fuel cell, which is different from the fluid supply for power generation of the fuel cell, supplies a flow of an organic solvent to lower the adhesion force at the boundaries between the sealing layers and the separators or at the boundaries between the sealing layers and the electrode assembly. This arrangement ensures easy disassembly of the fuel cell. Examples of the organic solvent include alcohols like methanol, ethanol, propanol, and butanol, ketones like acetone and methyl ethyl ketone, esters like methyl acetate and ethyl acetate, and diversity of release agents including a surfactant.

In the fuel cell of the invention, the sealing layers may be made of the functional material.

The present invention is further directed to a fuel cell that generates electric power through reaction of a fuel gas with an oxidizing gas. The fuel cell includes: an electrode assembly having an electrolyte interposed between a pair of electrodes; sealing layers located to surround periphery of the electrode assembly; a pair of separators arranged across the electrode assembly and bonded to the sealing layers, where one of the separators facing one of the electrodes has a fuel gas conduit, while the other of the separators facing the other of the electrodes has an oxidizing gas conduit; and a breaking guide that is formed in each of the separators to function as a starting point of breakage of the separator triggered by a fluid supply for disassembly of the fuel cell to supply a fluid to at least one of the fuel gas conduit and the oxidizing gas conduit.

In the fuel cell of this structure, when the fluid supply for disassembly of the fuel cell is provided to supply the fluid to at least one of the fuel gas conduit and the oxidizing gas conduit, the separator is broken from the breaking guide as the starting point. The fuel cell of this structure is thus readily disassembled.

In the fuel cell of this structure, a breaking guide may be formed in each of the separators to function as a starting point of breakage of the separator triggered by a fluid supply for disassembly of the fuel cell, which is different from a fluid supply for power generation of the fuel cell, to supply a fluid to at least one of the fuel gas conduit and the oxidizing gas conduit. When the fluid supply for disassembly of the fuel cell, which is different from the fluid supply for power generation of the fuel cell, is carried out to supply the fluid to at least one of the fuel gas conduit and the oxidizing gas conduit, the separator is broken from the breaking guide as the starting point. The fuel cell of this structure is thus readily disassembled.

BRIEF DESCRIPTION OF THE DRAWINGS

FIG. 5 shows disassembly of a fuel cell in one modified structure of the first embodiment;

FIG. 6 shows disassembly of a fuel cell in another modified structure;

FIG. 10 shows disassembly of a fuel cell in another modified structure;

BEST MODES OF CARRYING OUT THE INVENTION

Some modes of carrying out the invention are discussed below as preferred embodiments.

First Embodiment

Figure 1:
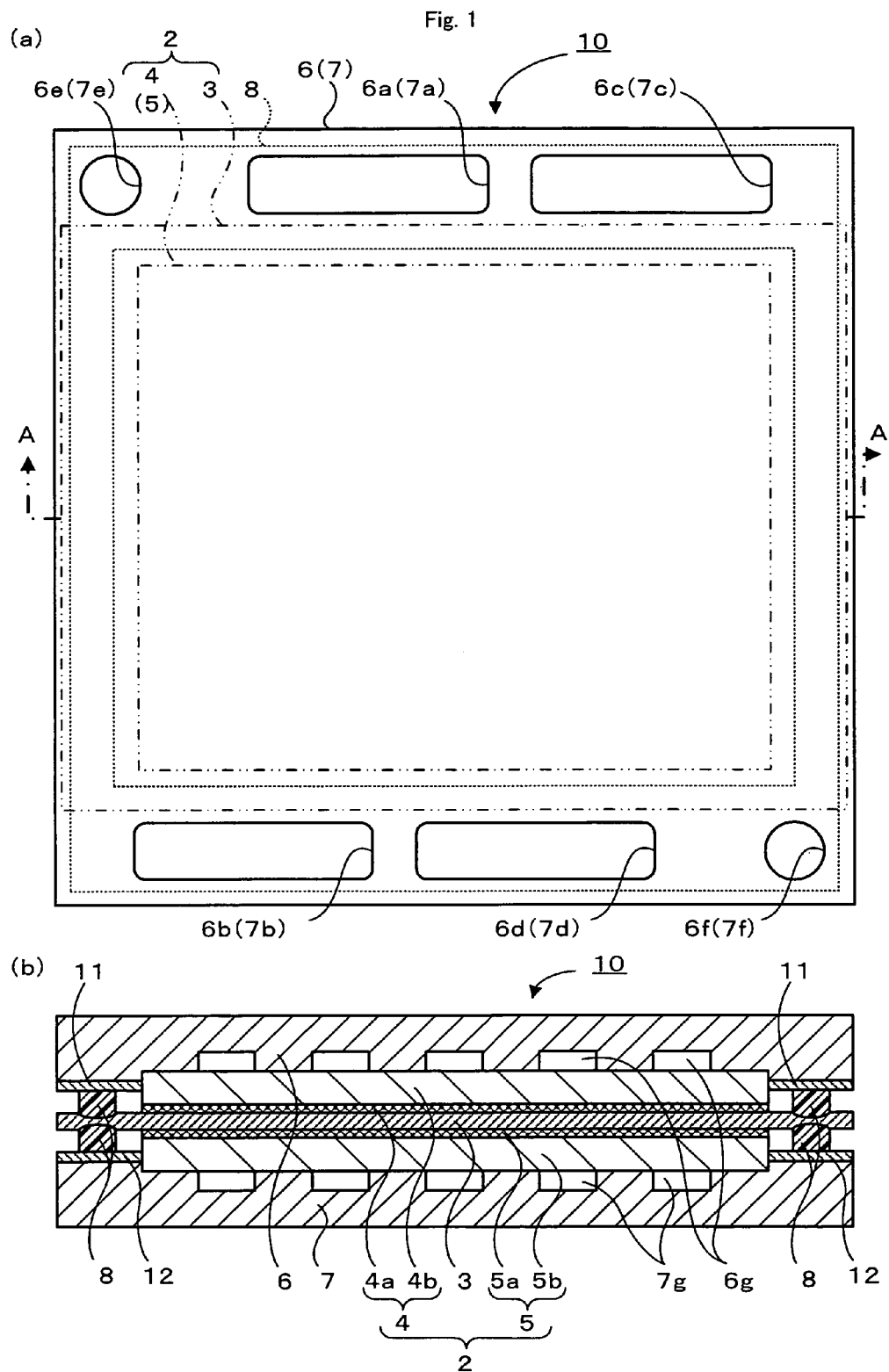
FIG. 1 schematically illustrates the structure of a fuel cell in a first embodiment of the invention.

FIG. 1 schematically illustrates the structure of a fuel cell 10 in a first embodiment of the invention. FIG. 1(*a*) is a plan view, and FIG. 1(*b*) is a sectional view taken on a line A-A of FIG. 1(*a*).

The fuel cell 10 of this embodiment is a polymer electrolyte fuel cell and includes, as main constituents, a membrane electrode assembly (hereafter referred to as MEA) 2 having an electrolyte membrane 3 interposed between a pair of electrodes 4 and 5, sealing layers 8 located to surround the outer circumference of the MEA 2, and a pair of separators 6 and 7 arranged across the MEA 2 and bonded to the sealing layers 8. The fuel cell 10 is a unit cell having an electromotive force in a range of about 0.6 to 0.8 V. A large number of the fuel cells 10 are tightly laid one upon another to form a direct current power source of several hundred volts as a power supply of, for example, a drive motor of the vehicle.

The MEA 2 has the electrolyte membrane 3 located between the fuel electrode or anode 4 and the oxygen electrode or cathode 5. In the structure of the MEA 2 of the embodiment, the area of the electrolyte membrane 3 is greater than the areas of the anode 4 and the cathode 5. The electrolyte membrane 3 is mainly made of a solid polymer material having good proton conductivity in wet state, such as a fluororesin membrane (for example, a Nafion membrane manufactured by DuPont). The anode 4 and the cathode 5 respectively have catalyst electrodes 4*a* and 5*a* and gas diffusion electrodes 4*b* and 5*b*. The catalyst electrodes 4*a* and 5*a* are located to be in contact with the electrolyte membrane 3 and are made of electrically conductive carbon black with fine platinum particles carried thereon. The gas diffusion electrodes 4*b* and 5*b* are laid upon the catalyst electrodes 4*a* and 5*a* and made of carbon cloth of carbon fibers. Platinum contained in the catalyst electrodes 4*a* and 5*a* function to accelerate separation of hydrogen into proton and electron, as well as production of water from oxygen, proton, and electron. Any other catalyst having the same functions may be used in place of platinum. The gas diffusion electrodes 4*b* and 5*b* are not restricted to the carbon cloth but may be made of carbon paper or carbon felt of carbon fibers. The carbon material is demanded to have sufficient gas diffusion property and electrical conductivity.

The separators 6 and 7 are made of a gas-impermeable electrically conductive material, for example, gas-impermeable molded carbon obtained by compressing carbon in this embodiment. The separators 6 and 7 respectively have fuel gas supply inlets 6*a* and 7*a* for supply of a fuel gas, fuel gas discharge outlets 6*b* and 7*b* for discharge of the fuel gas, oxidizing gas supply inlets 6*c* and 7*c* for supply of an oxidizing gas, oxidizing gas discharge outlets 6*d* and 7*d* for discharge of the oxidizing gas, coolant supply inlets 6*e* and 7*e* for supply of a coolant (for example, a cooling fluid), and coolant discharge outlets 6*f* and 7*f* for discharge of the coolant. One of the separators 6 has a fuel gas conduit 6*g* on a face in contact with the anode 4 of the MEA 2 to allow passage of the fuel gas, and a coolant conduit (not shown) on the opposite face to allow passage of the coolant. The fuel gas conduit 6*g* has multiple channels that are connected to the fuel gas supply inlet 6*a* and the fuel gas discharge outlet 6*b*, while not being connected to the other inlets or outlets. The coolant conduit is, on the other hand, connected to the coolant supply inlet 6*e* and the coolant discharge outlet 6*f*, while not being connected to the other inlets or outlets. A resin coating layer 11 is formed in the periphery of the fuel gas conduit 6*g* on the separator 6 and is bonded to the sealing layer 8. The resin coating layer 11 is made of an adhesive that is foamed in and swollen with hot water to be readily released (for example, an epoxy sealing material like Ecosepara CT-1683 or CT-1687 manufactured by Kaken Tech Co. Ltd., Japan). The other of the separators 7 has an oxidizing gas conduit 7*g* on a face in contact with the cathode 5 of the MEA 2 to allow passage of the oxidizing gas, and a coolant conduit (not shown) on the opposite face to allow passage of the coolant. The oxidizing gas conduit 7*g* has multiple channels that are connected to the oxidizing gas supply inlet 7*c* and the oxidizing gas discharge outlet 7*d*, while not being connected to the other inlets or outlets. The coolant conduit is, on the other hand, connected to the coolant supply inlet 7*e* and the coolant discharge outlet 7*f*, while not being connected to the other inlets or outlets. A resin coating layer 12 is formed in the periphery of the oxidizing gas conduit 7*g* on the separator 7 and is bonded to the sealing layer 8. The resin coating layer 12 is made of the same material as that of the resin coating layer 11. The separators 6 and 7 may be made of a metal, instead of carbon.

The sealing layers 8 are formed by solidifying an adhesive applied over the whole outer circumference of the electrolyte membrane 3 of the MEA 2 without the anode 4 and the cathode 5. The sealing layers 8 are bonded to the separators 6 and 7 via the resin coating layers 11 and 12. Namely the resin coating layers 11 and 12 are present on the boundaries of the sealing layers 8 and the separators 6 and 7. The sealing layers seal a space for the fuel gas defined by the electrolyte membrane 3 and the separator 6, while sealing a space for the oxidizing gas defined by the electrolyte membrane 3 and the separator 7. The sealing layers 8 have through holes formed at positions corresponding to the positions of the respective inlets and outlets 6*a* to 6*f* and 7*a* to 7*f* in the separators 6 and 7.

The following describes power generation of the fuel cell 10. For power generation of the fuel cell 10, a supply of humidified hydrogen is fed as the fuel gas to the fuel gas supply inlets 6*a* and 7*a*, while a supply of the air is fed as the oxidizing gas to the oxidizing gas supply inlets 6*c* and 7*c*. The flow of hydrogen goes from the fuel gas supply inlet 6*a* through the fuel gas conduit 6*g* to the fuel gas discharge outlet 6*b* to be discharge outside. The flow of the air goes from the oxidizing gas supply inlet 7*c* through the oxidizing gas conduit 7*g* to the oxidizing gas discharge outlet 7*d* to be discharge outside. The flow of hydrogen passes through the fuel gas conduit 6*g*, is diffused by the gas diffusion electrode 4*b* of the anode 4 to reach the catalyst electrode 4*a*, and is separated into proton and electron by the function of the catalyst electrode 4*a*. The protons are transmitted through the electrolyte membrane 3 in the wet state and are shifted to the cathode 5. The electrons pass through a non-illustrated external pathway to be shifted to the cathode 5. The flow of the air passes through the oxidizing gas conduit 7g, and is diffused by the gas diffusion electrode 5b to reach the catalyst electrode 5a. The proton, the electron, and oxygen in the air react to produce water and generate an electromotive force at the cathode 5. A supply of the coolant is externally fed into the coolant supply inlets 6e and 7e to keep the temperature of the fuel cell 10 in an adequate temperature range for power generation (for example, 70 to 80° C.). The flow of the coolant goes through the non-illustrates coolant conduits formed in the separators 6 and 7, is discharged from the coolant discharge outlets 6f and 7f, is cooled down by a non-illustrated heat exchanger, and is recirculated into the coolant supply inlets 6e and 7e. The electrolyte membrane 3 of the MEA 2 works to conduct the proton, while functioning as an insulation membrane to prevent the air from directly coming into contact with the hydrogen inside the fuel cell 10. The sealing members 8 prevent the air from being mixed with the hydrogen on the periphery of the MEA 2, while preventing the air and the hydrogen from leaking out of the fuel cell 10.

Figure 2:
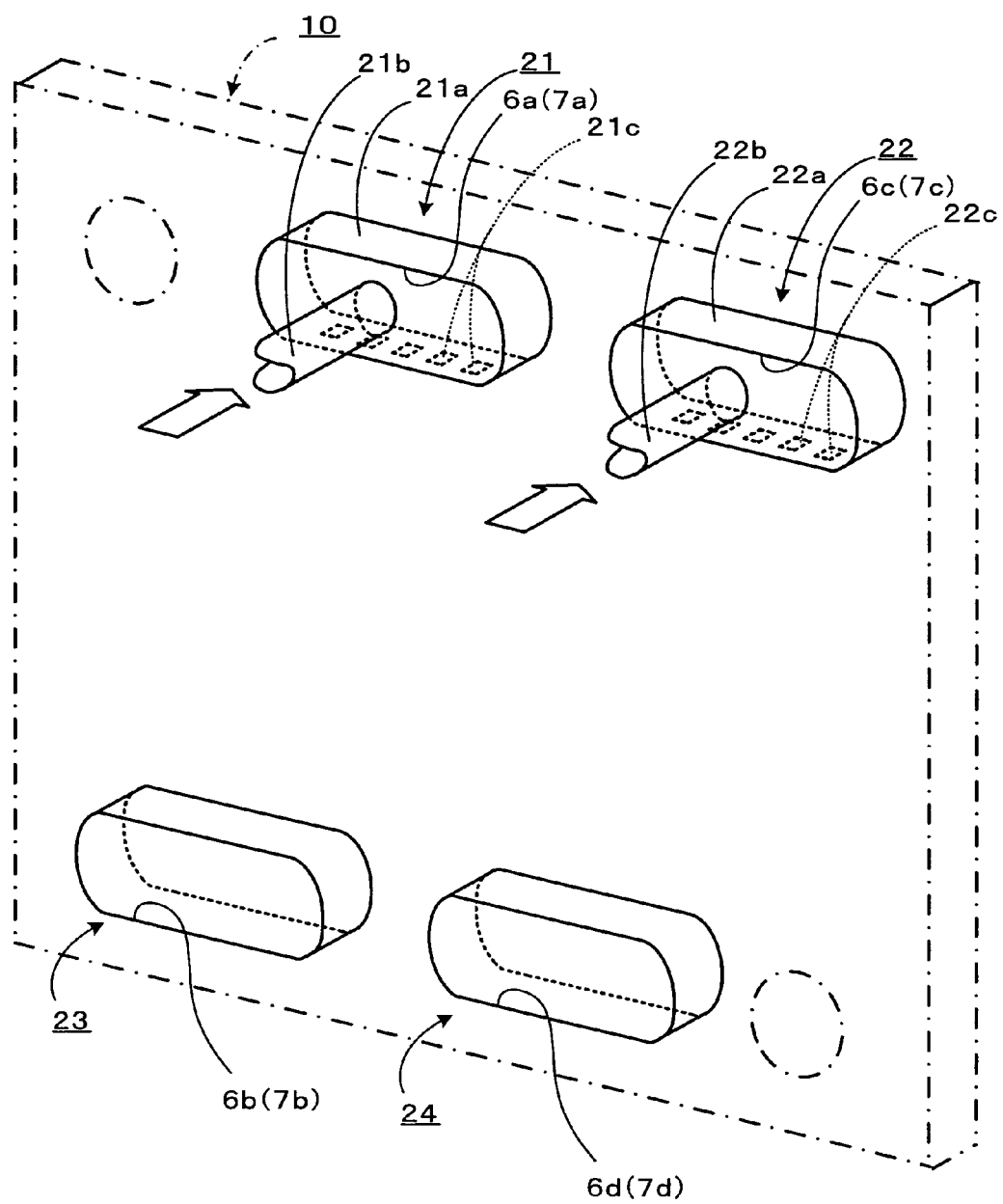
FIG. 2 shows the flows of hot water fed to respective gas conduits of the fuel cell.
Figure 3:
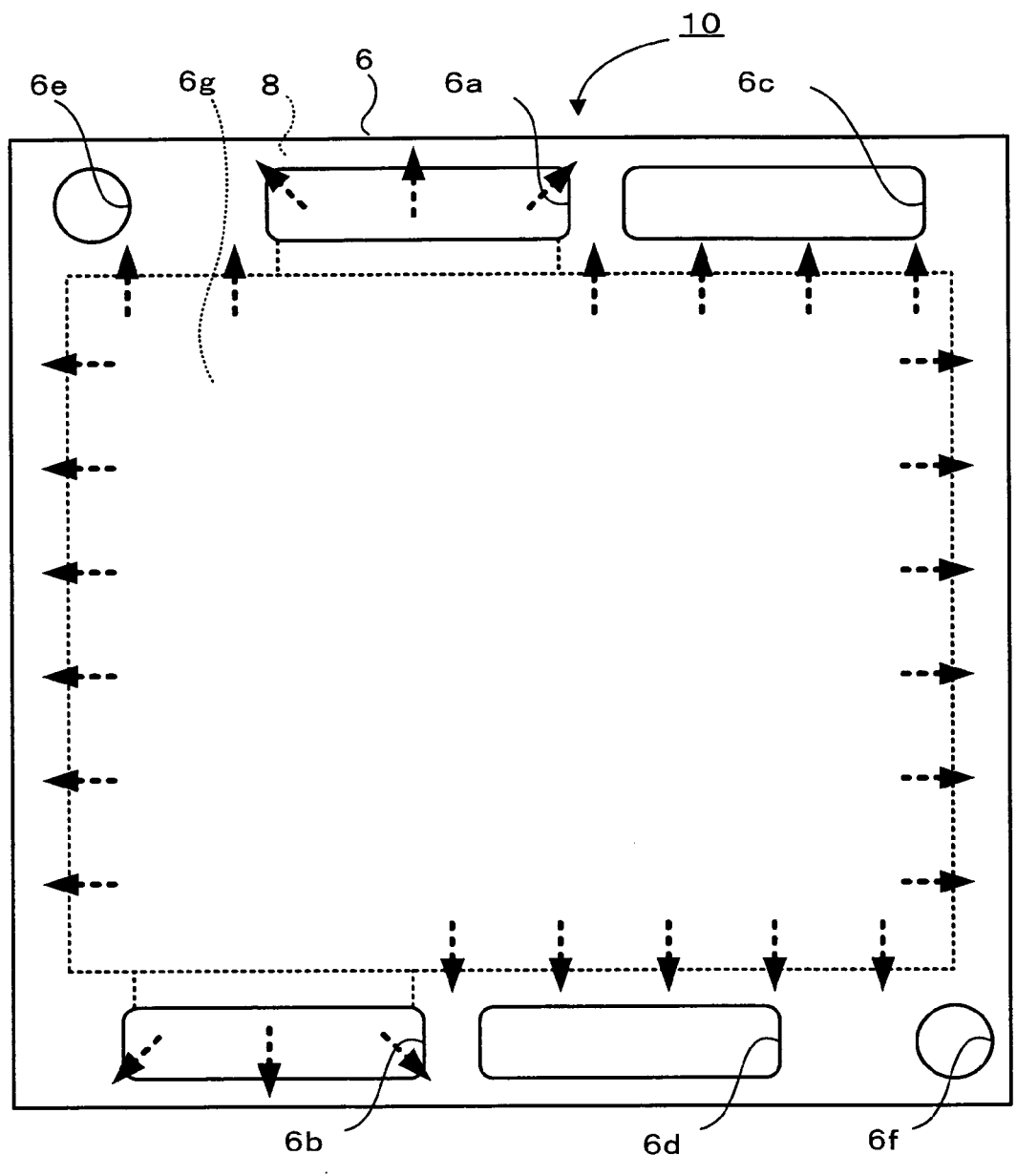
FIG. 3 shows the directions of forces applied by the flows of hot water fed to the respective gas conduits.
Figure 4:
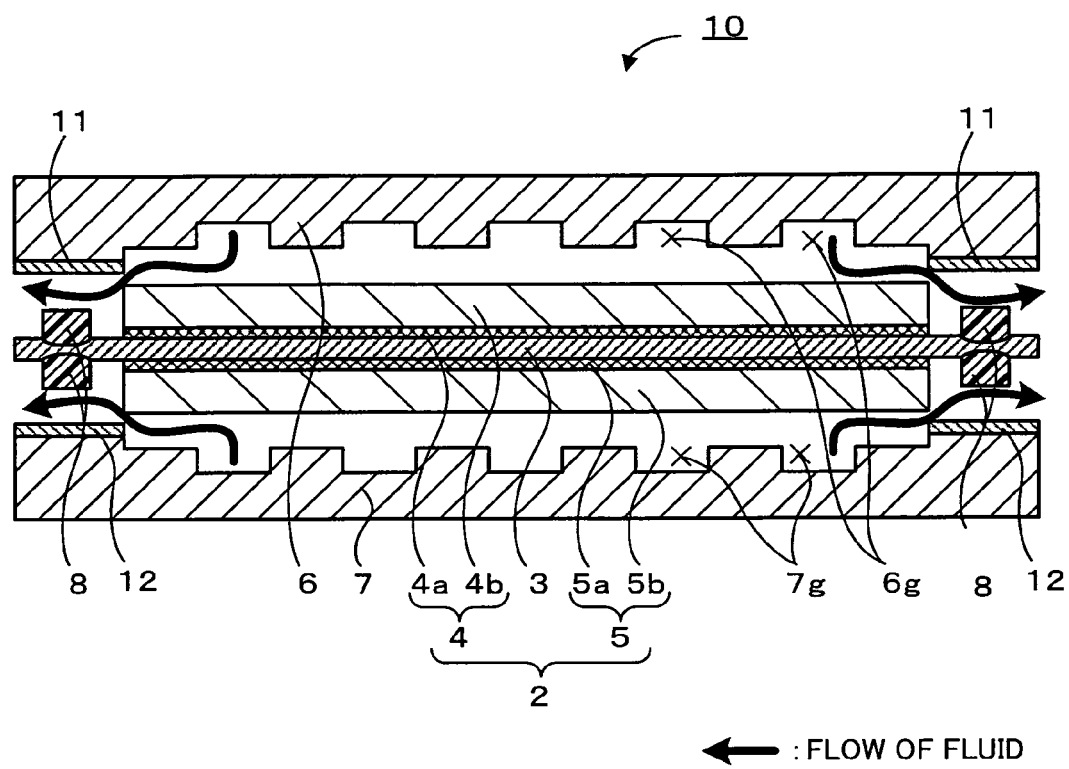
FIG. 4 shows disassembly of the fuel cell.

The procedure of disassembling the fuel cell 10 is described with reference to FIGS. 2 through 4. FIG. 2 shows the flows of hot water fed to the respective gas conduits 6g and 7g of the fuel cell 10. FIG. 3 shows the directions of forces applied onto the sealing layers 8 by the flows of hot water fed to the respective gas conduits 6g and 7g. FIG. 4 shows disassembly of the fuel cell 10.

As shown in FIG. 2, rubber fluid feed caps 21 and 22 are set respectively in the fuel gas supply inlets 6a and 7a and in the oxidizing gas supply inlets 6c and 7c of the fuel cell 10, and rubber shield caps 23 and 24 are set respectively in the fuel gas discharge outlets 6b and 7b and in the oxidizing gas discharge outlets 6d and 7d. The fluid feed cap 21 includes a cap main body 21a that is in close contact with the inner circumferential faces of the fuel gas supply inlets 6a and 7a, a tube 21b that is connected to a front face of the cap main body 21a, and multiple discharge openings 21c that are formed in the bottom face of the cap main body 21a to connect with the inlets of the fuel gas conduit 6g. The tube 21b is connected with the discharge openings 21c via passages (not shown) formed inside the cap main body 21a. Similarly the fluid feed cap 22 includes a cap main body 22a, a tube 22b, and multiple discharge openings 22c connecting with the inlets of the oxidizing gas conduit 7g. The shield cap 23 is set to be in close contact with the inner circumferential faces of the fuel gas discharge outlets 6b and 7b to shield the outlets of the fuel gas conduit 6g. Similarly the shield cap 24 is set to be in close contact with the inner circumferential faces of the oxidizing gas discharge outlets 6d and 7d to shield the outlets of the oxidizing gas conduit 7g.

A pump (not shown) is driven to supply the flow of hot water to the fuel gas conduit 6g via the tube 21b and the multiple discharge openings 21c of the fluid feed cap 21, while supplying the flow of hot water to the oxidizing gas conduit 7g via the tube 22b and the multiple discharge openings 22c of the fluid feed cap 22. The flows of hot water are heated to an adequate temperature that ensures release of the resin coating layers 11 and 12 from the sealing layers 8. The outlets of the fuel gas conduit 6g and the outlets of the oxidizing gas conduit 7g are shielded by the shield caps 23 and 24. As the flows of hot water are continuously fed, the internal pressure or in-passage pressure of the respective gas conduits 6g and 7g gradually rises and eventually exceeds a specific in-passage pressure level for power generation of the fuel cell 10. The high in-passage pressure applies forces onto the fuel gas conduit 6g in the directions of arrows shown in FIG. 3, that is, radial forces applied outward onto the fuel gas conduit 6g. Similarly the high in-passage pressure applies radial forces (not shown) applied outward onto the oxidizing gas conduit 7g. The high in-passage pressure expands the gas diffusion electrode 4b and the separator 6, which define the fuel gas conduit 6g, in opposite directions to make a clearance between the gas diffusion electrode 4b and the separator 6. Similarly the high in-passage pressure expands the gas diffusion electrode 5b and the separator 7, which define the oxidizing gas conduit 7g, in opposite directions to make a clearance between the gas diffusion electrode 5b and the separator 7. The supplied hot water then flows out through these clearances to make the resin coating layers 11 and 12 soaked therein. The resin coating layers 11 and 12 are foamed in and swollen with the hot water, so that the separators 6 and 7 are released from the electrolyte membrane 3 of the MEA 2. The high in-passage pressure applies the forces in the directions of separating the sealing layers 8 from the resin coating layers 11 and 12 formed on the separators 6 and 7. These forces facilitate the release of the separators 6 and 7 as shown in FIG. 4. The in-passage pressure may be enhanced until the separators 6 and 7 are released from the sealing layers 8. Alternatively the pump may be driven to apply the pressure to a predetermined releasing level, which is set in advance experimentally. The resin coating layers 11 and 12 may also be released from the separators 6 and 7.

The supply of the fuel gas and the oxidizing gas for power generation of the fuel cell 10 in this embodiment corresponds to the 'fluid supply for power generation of the fuel cell' in the claims of the invention. The supply of hot water having a higher temperature than the temperature for power generation to heighten the internal pressure or in-passage pressure over a specific level for power generation in this embodiment is equivalent to the 'fluid supply for disassembly of the fuel cell' in the claims of the invention. Namely the type, the temperature, and the pressure of the fluid supplied for power generation of the fuel cell 10 of the embodiment are different from those of the fluid fed for disassembly of the fuel cell 10.

In the structure of the embodiment described above, the fluid supply for disassembly of the fuel cell 10 under the different conditions from those of the fluid supply for power generation of the fuel cell 10 heightens the internal pressure or the in-passage pressure and causes the resin coating layers 11 and 12 to be foamed in and swollen with hot water. The separators 6 and 7 are accordingly released from the sealing layers 8. This arrangement thus ensures easy disassembly of the fuel cell 10. Even when the resulting releasing power is an insufficient level, this operation significantly lowers the adhesion force between the sealing layers 8 and the separators 6 and 7. The operator can thus readily release the separators 6 and 7 from the sealing layers 8 to disassemble the fuel cell 10 by simple application of some external force directly or via an adequate jig, compared with the cited structure of the prior art fuel cell (see Japanese Patent Laid-Open Gazette No. 2002-151112).

The structure of the first embodiment discussed above may be modified in various manners.

For example, in the structure of the fuel cell 10 of the first embodiment, the resin coating layers 11 and 12 are formed on the separators 6 and 7 to be bonded to the sealing layers 8. Alternatively resin coating layers may be formed on the sealing layers 8 to be bonded to the separators 6 and 7. In another example shown in FIG. 5(a), resin coating layers 13 and 14 are formed on the electrolyte membrane 3 of the MEA 2 to be bonded to the sealing layers 8. In this modified structure, the supply of hot water to the respective gas conduits 6g and 7g heightens the in-passage pressure over the specific level for power generation of the fuel cell 10 to release the sealing layers 8 from the electrolyte membrane 3 of the MEA 2 as shown in FIG. 5(*b*). In still another example shown in FIG. 6(*a*), the fuel cell 10 does not have the resin coating layers 11 and 12, but the sealing layers 8 are made of an adhesive that is foamed in and swollen with hot water to be readily released, such as the epoxy sealing material like Ecosepara CT-1683 or CT-1687 manufactured by Kaken Tech Co. Ltd., Japan. In this modified structure, the supply of hot water to the respective gas conduits 6*g* and 7*g* heightens the in-passage pressure over the specific level for power generation of the fuel cell 10 to release the sealing layers 8 from the electrolyte membrane 3 and the separators 6 and 7 as shown in FIG. 6(*b*). In the structure of FIG. 6, the sealing layers 8 may alternatively be made of a conventional material, for example, an epoxy resin. The supply of a liquid or a gas to the respective gas conduits 6*g* and 7*g* heightens the in-passage pressure over the specific level for power generation of the fuel cell 10 to release the sealing layers 8 from the separators 6 and 7.

Figure 7:
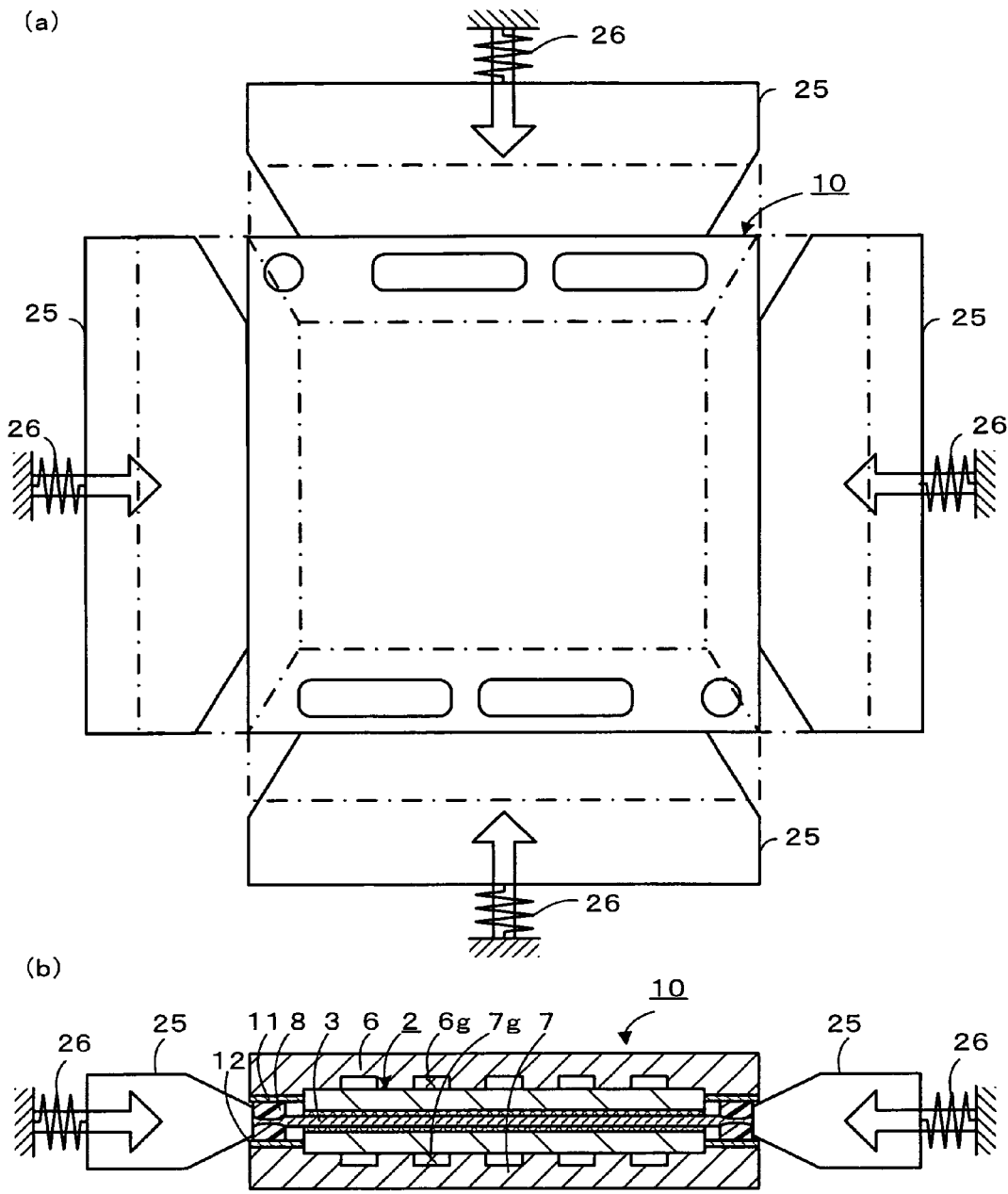
FIG. 7 shows an example of insertion members.

An external force may be applied onto the pair of separators 6 and 7 in the mutually parting directions, that is, in the directions of separating the separators 6 and 7 from each other, while the flows of hot water are fed to the respective gas conduits 6*g* and 7*g* for disassembly of the fuel cell 10. For example, as shown in FIG. 7, insertion members 25 having wedge-shaped edges are set on the four sides of the quasi-rectangular fuel cell 10 and are pressed by means of springs 26 in the directions of insertion between the separators 6 and 7. In this modified structure, as the flows of hot water fed to the respective gas conduits 6*g* and 7*g* reduce the adhesion force between the sealing layers 8 and the separators 6 and 7, the insertion members 25 are inserted between the separators 6 and 7 (as shown by the one-dot chain lines in FIG. 7(*a*)) to apply the forces onto the separators 6 and 7 in the mutually parting directions. The sealing layers 8 are thus readily released from the separators 6 and 7.

Figure 8:
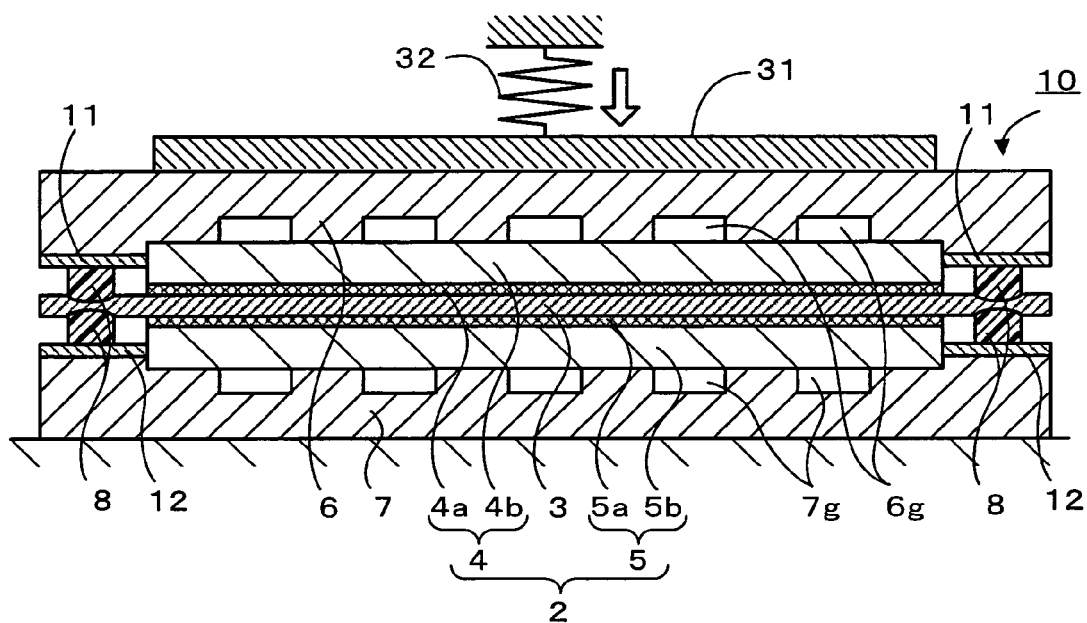
FIG. 8 shows an example of a retainer plate for pressing downward against separator.
Figure 9:
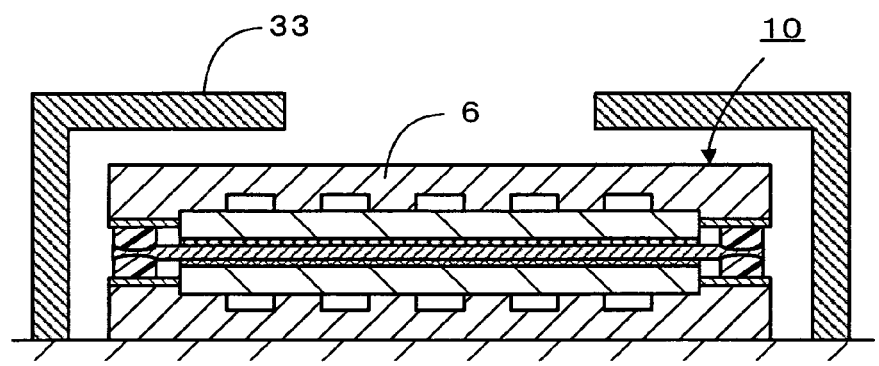
FIG. 9 shows an example of a cover for surrounding the periphery of the top face of separator.

The procedure of the first embodiment heightens the in-passage pressure of the fuel gas conduit 6*g* and the oxidizing gas conduit 7*g* to be higher than the specific level for power generation of the fuel cell 10. It is accordingly desirable to keep pressing the separator 6 or surround the separator 6, in order to prevent the separator 6 released from the sealing layer 8 from being jumped out. In one example of FIG. 8, a retainer plate 31 is placed on the separator 6 and is pressed downward against the separator 6 by means of a spring 32. The pressing force of the spring 32 is desirably set to a level that does not interfere with release of the sealing layers 8 from the separators 6 and 7. In another example of FIG. 9, a cover 33 with a top opening is placed to surround the periphery of the top face of the separator 6.

In the structure of the first embodiment, the flows of hot water are fed to the respective gas conduits 6*g* and 7*g* to make the resin coating layers 11 and 12 foamed in and swollen with hot water and thereby disassemble the fuel cell 10. The fluid fed to the respective gas conduits 6*g* and 7*g* is, however, not restricted to hot water, but may be an organic solvent or a release agent having the function of dissolving or softening the sealing layers 8. The organic solvent heated or kept at room temperature may be fed to the respective gas conduits 6*g* and 7*g*. Available examples of the organic solvent include alcohols like methanol, ethanol, propanol, and butanol, ketones like acetone and methyl ethyl ketone, and esters like methyl acetate and ethyl acetate. Examples of the release agent include a surfactant. The organic solvent functions to reduce the adhesion force of the sealing layers 8. The operator applies an external force in the directions of parting the separators 6 and 7 from each other directly or via the insertion members 25 (see FIG. 7) to readily release the sealing layers 8 from the separators 6 and 7. In this modified arrangement, the resin coating layers 11 and 12 may be formed or may be omitted. The in-passage pressure may be kept at a level equivalent to the specific level for power generation of the fuel cell 10, but is preferably heightened over the specific level for power generation to apply the forces in the directions of separating the sealing layers 8 from the separators 6 and 7.

In the structure of the first embodiment, the flows of hot water fed to the respective gas conduits 6*g* and 7*g* heighten the in-passage pressure over the specific level for power generation, in order to disassemble the fuel cell 10. One possible modification may supply the fuel gas and the oxidizing gas, which are used for power generation of the fuel cell 10, to the respective gas conduits 6*g* and 7*g* to heighten the in-passage pressure over the specific level for power generation and thereby disassemble the fuel cell 10. The enhanced in-passage pressure applies the forces in the directions of parting the sealing layers 8 and the separators 6 and 7 from each other, thus enabling the sealing layers 8 to be readily released from the separators 6 and 7.

Instead of the resin coating layers 11 and 12 formed in the structure of the embodiment, continuous or intermittently-arranged grooves 40, 40 may be formed as breaking guides in the inner faces of and along the peripheries of the separators 6 and 7 as shown in FIG. 10(*a*). The supply of a liquid or a gas to the respective gas conduits 6*g* and 7*g* heightens the in-passage pressure over the specific level for power generation and thereby causes the separators 6 and 7 to be broken from the grooves 40, 40 as shown in FIG. 10(*b*). In this modified structure, it is also desirable to keep pressing the separator 6 or surround the separator 6 (see FIGS. 8 and 9), in order to prevent the separator 6 released from the sealing layer 8 from being jumped out.

The above embodiments regard the polymer electrolyte fuel cell and a stack structure of such polymer electrolyte fuel cells. The principle of the invention is also applicable to other types of fuel cells including solid oxide fuel cells, molten carbonate fuel cells, phosphoric acid fuel cells, and alkaline fuel cells. The sealing layers 8 and 56 formed by curing the adhesive in the structures of the first and the second embodiments discussed above may be replaced by gaskets. The adhesive and the gaskets may be made of, for example, a fluororesin or a silicone resin.

Second Embodiment

Figure 11:
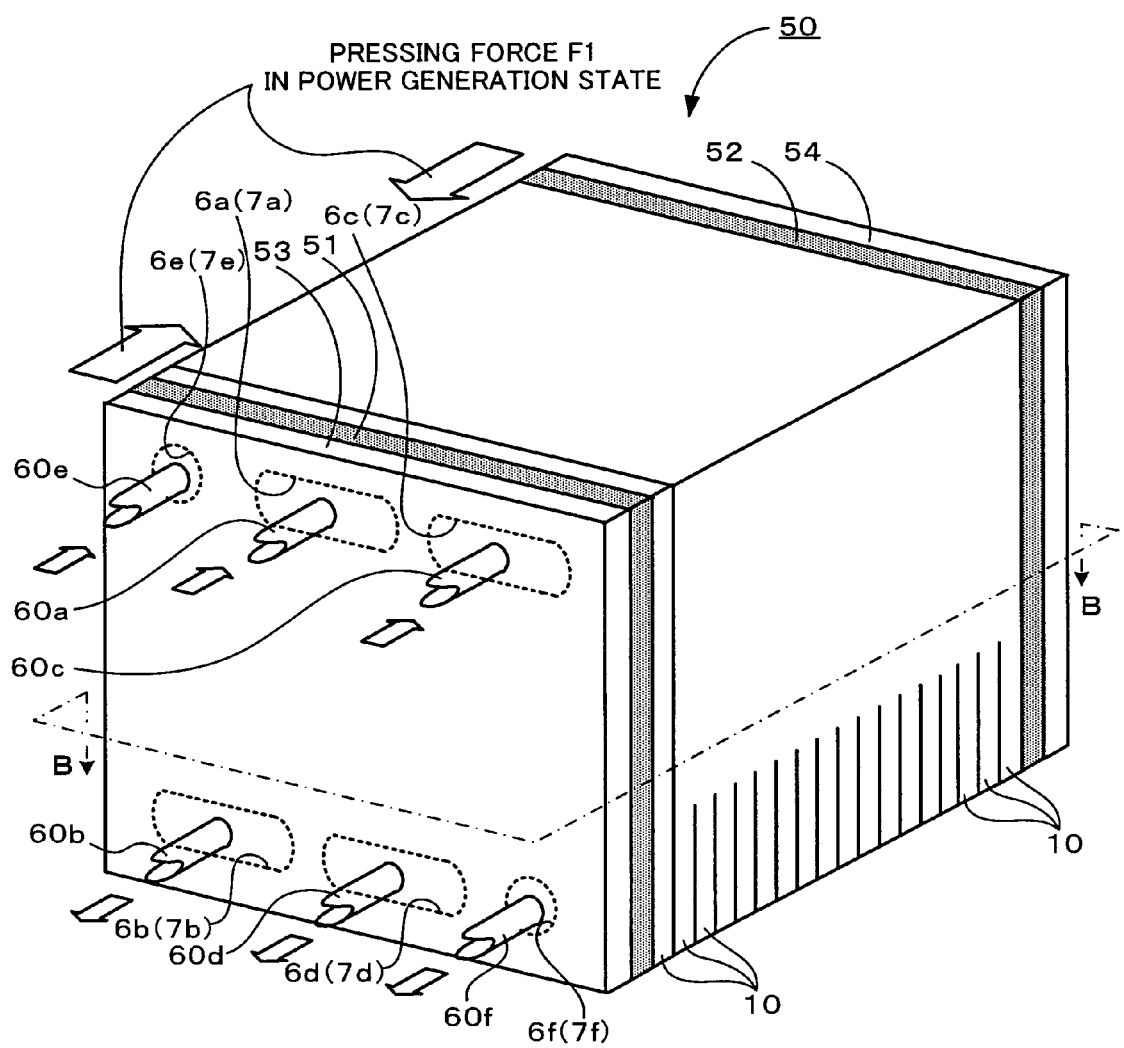
FIG. 11 is a perspective view showing a fuel cell stack 50 in state of power generation in a second embodiment of the invention.
Figure 12:
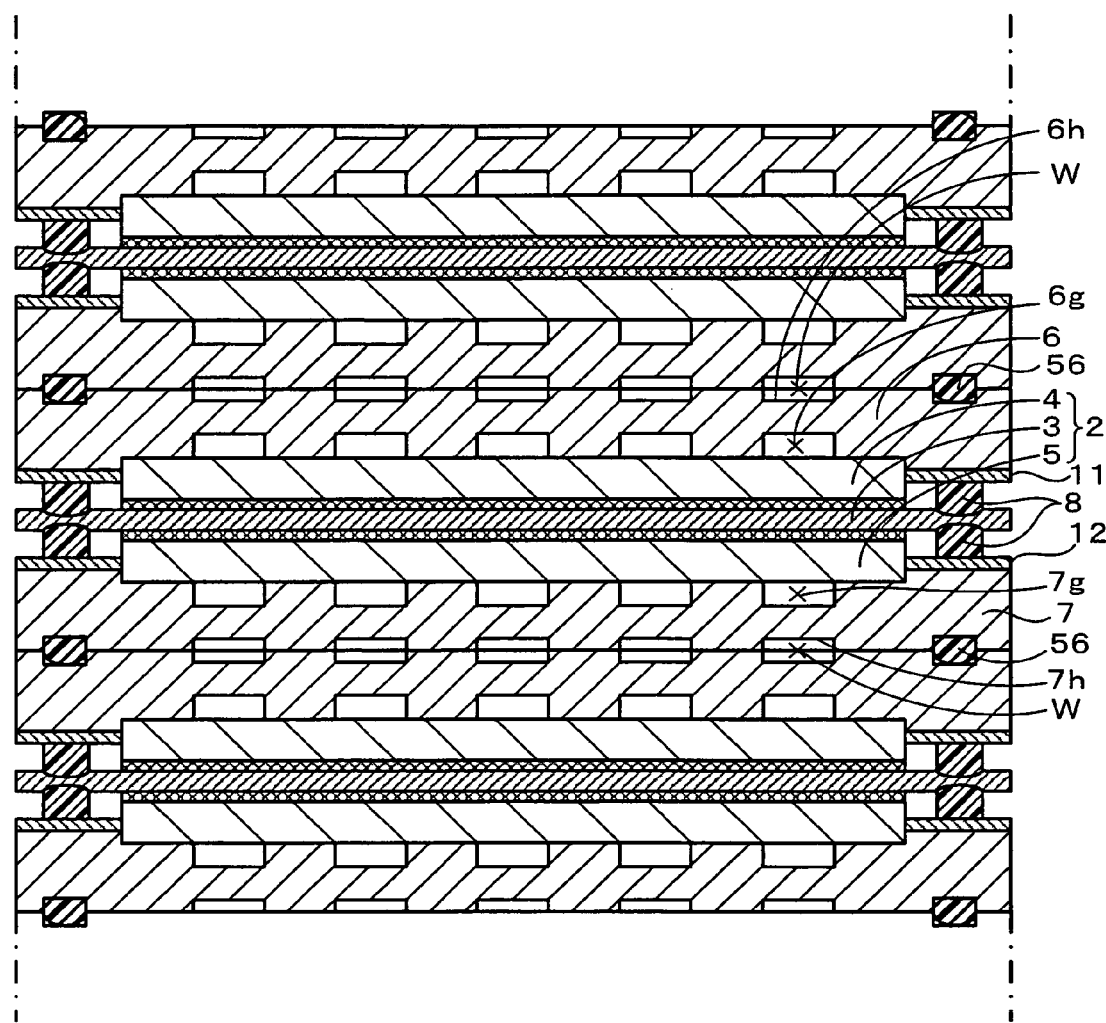
FIG. 12 is a sectional view taken on a line B-B of FIG. 11.

A second embodiment of the invention regards a fuel cell stack 50, which is a layered body of plurality of the fuel cells 10. FIG. 11 is a perspective view showing the fuel cell stack 50 in the state of power generation in the second embodiment of the invention. FIG. 12 is a sectional view taken on a line B-B of FIG. 11. In the illustration of FIGS. 11 and 12, the respective constituents of the fuel cells 10 are expressed by the like numerals and symbols to those of the first embodiment.

As shown in FIG. 11, the fuel cell stack 50 has a cell laminate of the multiple fuel cells 10 of the first embodiment, which are closely and tightly layered one upon another, and end plates 53 and 54 that are arranged across the cell laminate via insulator plates 51 and 52 and are pressed in a compression direction with a pressing force F1 applied by a pressure device (not shown). The fuel cell stack 50 is used as a power source of several hundred volts. The end plate 53 shown on the front side of FIG. 11 has supply pipes 60*a*, 60*c*, and 60*e* to feed the supplies of the fuel gas, the oxidizing gas, and the coolant to the fuel gas supply inlets 6a and 7a, the oxidizing gas supply inlets 6c and 7c, and the coolant supply inlets 6e and 7e of the respective fuel cells 10 via the insulator plate 51. The end plate 53 also has discharge pipes 60b, 60d, and 60f to discharge the exhausts of the fuel gas, the oxidizing gas, and the coolant from the fuel gas discharge outlets 6b and 7b, the oxidizing gas discharge outlets 6d and 7d, and the coolant discharge outlets 6f and 7f of the respective fuel cells 10 via the insulator plate 51. The insulator plate 52 shown on the backside of FIG. 11 is a blockage plate to block the respective inlets and outlets 6a to 6f and 7a to 7f. In the fuel cell stack 50, the fuel gas supply inlets 6a and 7a of the respective fuel cells 10 are sequentially connected to form a fuel gas supply manifold, while the fuel gas discharge outlets 6b and 7b of the respective fuel cells 10 are sequentially connected to form a fuel gas exhaust manifold. The oxidizing gas supply inlets 6c and 7c of the respective fuel cells 10 are sequentially connected to form an oxidizing gas supply manifold, while the oxidizing gas discharge outlets 6d and 7d of the respective fuel cells 10 are sequentially connected to form an oxidizing gas exhaust manifold. The coolant supply inlets 6e and 7e of the respective fuel cells 10 are sequentially connected to form a coolant supply manifold, while the coolant discharge outlets 6f and 7f of the respective fuel cells 10 are sequentially connected to form a coolant exhaust manifold. In each of the fuel cells 10, the fuel gas supply inlets 6a and 7a are connected with the fuel gas discharge outlets 6b and 7b via the fuel gas conduit 6g (see FIG. 12). The oxidizing gas supply inlets 6c and 7c are connected with the oxidizing gas discharge outlets 6d and 7d via the oxidizing gas conduit 7g (see FIG. 12). The coolant supply inlets 6e and 7e are connected with the coolant discharge outlets 6f and 7f via a coolant conduit W (see FIG. 12).

Although not being specifically illustrated in the first embodiment, coolant conduit forming concaves 6h and 7h are provided on the rear faces of the separators 6 and 7 as shown in FIG. 12. As the rear faces of the separators 6 and 7 are stuck together, the opposing coolant conduit forming concaves 6h and 7h are combined to form the coolant conduit W. The coolant conduit W is sealed with a sealing layer 56 arranged along the outer ends of the rear faces of the separators 6 and 7. The sealing layer 56 prevents the flow of the coolant through the coolant conduits W from leaking out of the fuel cells 10. The rear faces of the separators 6 and 7 are in close contact with each other, except the coolant conduit W and the sealing layer 56. The sealing layers 8 are arranged to surround the periphery of the MEA 2 between the pair of separators 6 and 7. These sealing layers 8 prevent the air and the hydrogen gas from being mixed in the periphery of the MEA 2, while preventing the flows of the air and the hydrogen gas from leaking out of the fuel cells 10. The close contact of the rear faces of the separators 6 and 7 ensure the sufficient electric conductivity of the laminated fuel cells 10, while preventing localization of a stress under application of the pressing force F1 by the pressure device (not shown).

In the power generation state, the fuel cell stack 50 receives the pressing force F1 applied in the compression direction by the pressure device (not shown). In this state, the supply of the fuel gas (hydrogen) fed from the pipe 60a of the fuel cell stack 50 flows through the fuel gas supply inlets 6a and 7a, the fuel gas conduits 6g, and the fuel gas discharge outlets 6b and 7b of the respective fuel cells 10 included in the fuel cell stack 50 and is eventually discharged from the pipe 60b. The supply of the oxidizing gas (the air) fed from the pipe 60c of the fuel cell stack 50 flows through the oxidizing gas supply inlets 6c and 7c, the oxidizing gas conduits 7g, and the oxidizing gas discharge outlets 6d and 7d of the respective fuel cells 10 included in the fuel cell stack 50 and is eventually discharged from the pipe 60d. The supplies of the fuel gas and the oxidizing gas fed to the fuel cell stack 50 are subjected to the electrochemical reaction (discussed previously) in the respective fuel cells 10. The fuel cell stack 50 thus totally generates an electromotive force of several hundred volts. The coolant is flowed to keep the temperature of the fuel cell stack 50 in an adequate temperature range for power generation (for example, in a temperature range of 70 to 80° C.). The coolant fed from the pipe 60e flows through the coolant supply inlets 6e and 7e, the coolant conduits W, and the coolant discharge outlets 6f and 7f of the respective fuel cells 10 included in the fuel cell stack 50 and is eventually discharged from the pipe 60f. The discharged flow of the coolant goes through a heat exchanger (not shown) to be cooled down and is recirculated to the pipe 60e.

Figure 13:
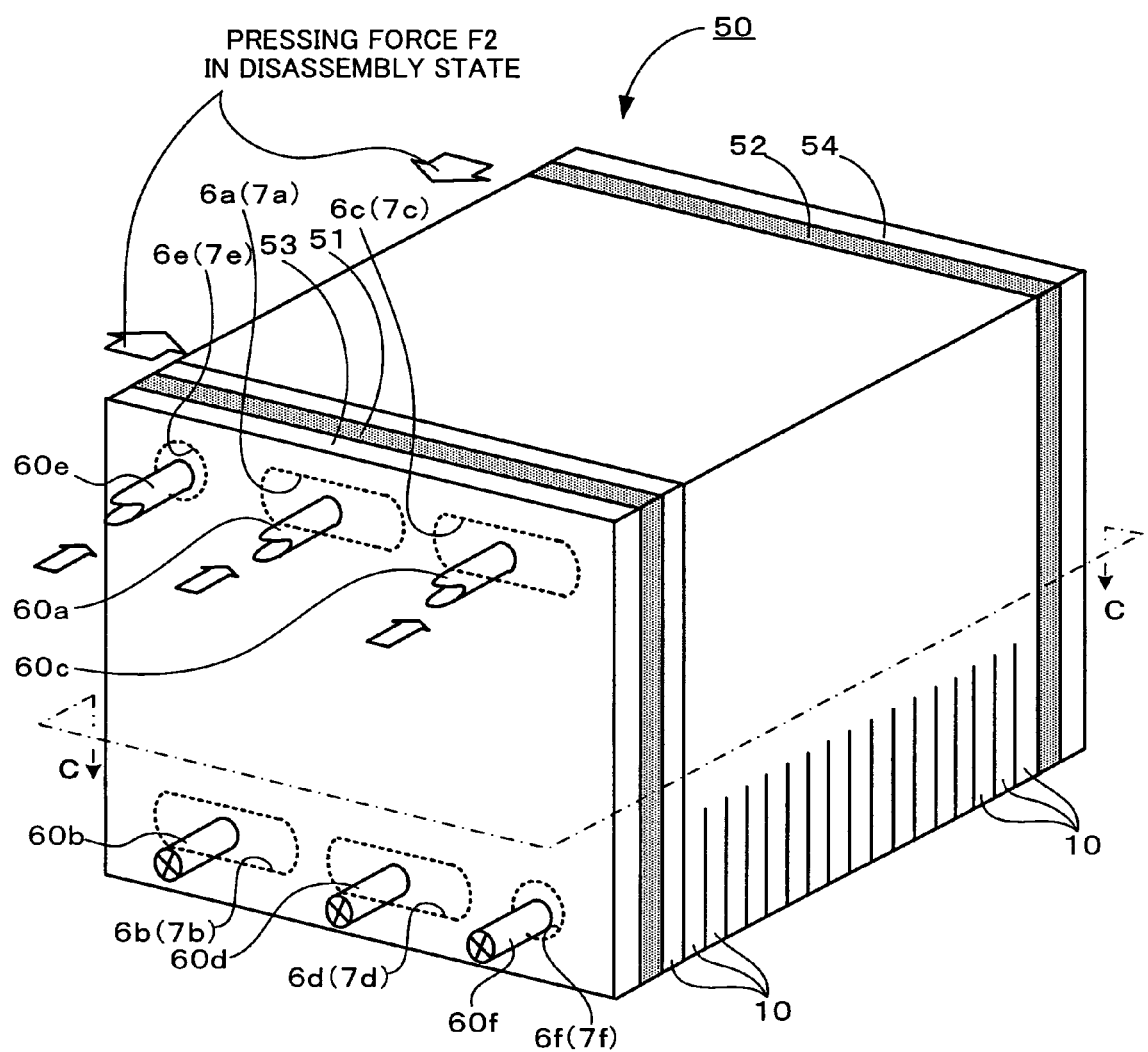
FIG. 13 is a perspective view showing the fuel cell stack 50 in state of disassembly.
Figure 14:
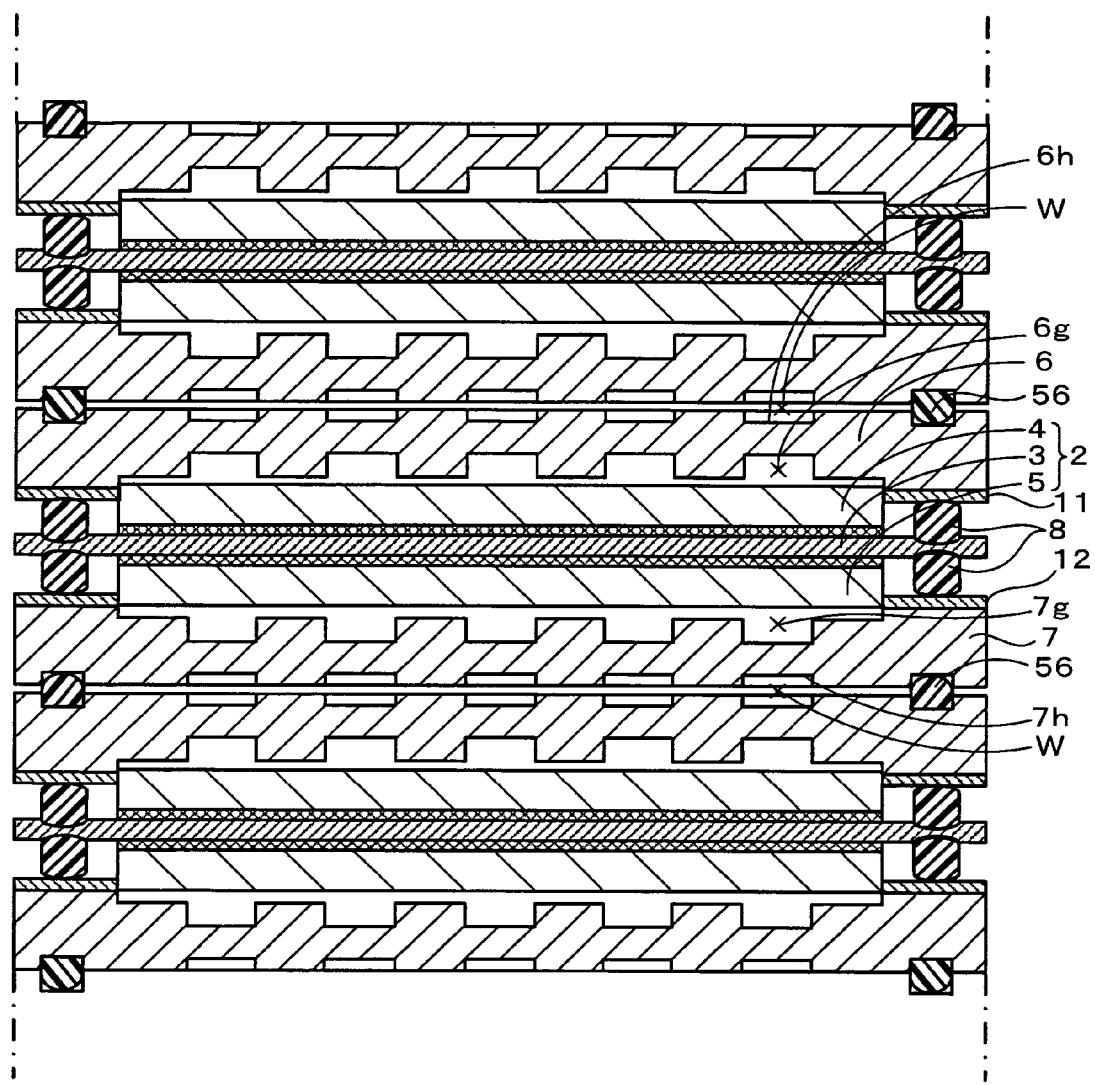
FIG. 14 is a sectional view taken on a line C-C of FIG. 13.

The procedure of disassembling the fuel cell stack 50 and the respective fuel cells 10 is described with reference to FIGS. 13 and 14. FIG. 13 is a perspective view showing the fuel cell stack 50 in the state of disassembly. FIG. 14 is a sectional view taken on a line C-C of FIG. 13. In the illustration of FIGS. 13 and 14, the respective constituents of the fuel cells 10 are expressed by the like numerals and symbols to those of the first embodiment.

In the disassembly state, a weak pressing force F2 (that is smaller than the pressing force F1) is applied to the fuel cell stack 50 in the compression direction by the pressure device (not shown). The pressing force F2 may be equal to zero. While the pipes 60b, 60d, and 60f are set in respective closed positions by on-off valves (not shown), the fuel gas, the oxidizing gas, and the coolant are fed into the pipes 60a, 60c, and 60e. The in-passage pressures of the fuel gas conduit 6g, the oxidizing gas conduit 7g, and the coolant conduit W are measured with pressure gauges (not shown) connecting with the pipes 60a, 60c, and 60e. The supplies of the fuel gas, the oxidizing gas, and the coolant are regulated to gradually increase the respective in-passage pressures. The gradual increases of the in-passage pressures expand the anode 4 and the separator 6 of defining the fuel gas conduit 6g in opposite directions to make a clearance between the anode 4 and the separator 6, expand the cathode 5 and the separator 7 of defining the oxidizing gas conduit 7g in opposite directions to make a clearance between the cathode 5 and the separator 7, and expand the pair of separators 6 and 7 of defining the coolant conduit W in opposite directions to make a clearance between the pair of separators 6 and 7. This reduces the contact areas of the sealing layers 8 with the separators 6 and 7 via the resin coating layers 11 and 12 and the contact areas of the sealing layer 56 with the separators 6 and 7 in each of the fuel cells 10 of the fuel cell stack 50 in the disassembly state, compared with the corresponding contact areas in the power generation state. The reduced contact areas facilitate subsequent disassembly of the fuel cell stack 50 and the respective fuel cells 10. The excessively high in-passage pressure undesirably breaks the seal of the sealing layers 8 and 56 in some of the fuel cells 10. The broken seal causes leakage of the pressure and thereby lowers the in-passage pressure. The in-passage pressure is thus regulated to keep a sufficient level of sealing properties of the sealing layers 8 and 56. One possible regulation method experimentally specifies an adequate level of in-passage pressure that reduces the contact areas of the sealing layers 8 with the separators 6 and 7 via the resin coating layers 11 and 12 and the contact areas of the sealing layer 56 with the separators 6 and 7 while keeping the sufficient level of sealing properties of the sealing layers 8 and

56. The procedure regulates the supplies of the fuel gas, the oxidizing gas, and the coolant to attain the specified adequate level of in-passage pressure.

The supply of the fuel gas, the oxidizing gas, and the coolant for power generation of the fuel cell stack 50 in this embodiment corresponds to the 'fluid supply for power generation of the fuel cell' in the claims of the invention. The supply of the fuel gas, the oxidizing gas, and the coolant for disassembly of the fuel cell stack 50 in this embodiment corresponds to the 'fluid supply for disassembly of the fuel cell' in the claims of the invention. The fluid supply for disassembly of the fuel cell stack 50 in this embodiment provides the identical fluids with those in the fluid supply for power generation of the fuel cell stack 50 but is regulated to give an in-passage pressure different from the level of in-passage pressure for power generation.

As described above, in the process of disassembling the fuel cell stack 50 of the second embodiment, the identical fluids with those in the fluid supply for power generation of the fuel cell stack 50 are supplied under the condition of the lowered pressing force applied to the fuel cell stack 50 to gradually increase the in-passage pressure. The procedure of the second embodiment reduces the contact areas of the sealing layers 8 with the separators 6 and 7 via the resin coating layers 11 and 12 and the contact areas of the sealing layer 56 with the separators 6 and 7 in the disassembly state, while keeping the sufficient levels of sealing properties of the sealing layers 8 and 56. This relatively lowers the adhesion force between the sealing layers 8 and the separators 6 and 7 and the adhesion force between the sealing layer 56 and the separators 6 and 7 in each of the fuel cells 10 of the fuel cell stack 50. The operator can thus readily release the separators 6 and 7 from the sealing layers 8 and 56 to disassemble the respective fuel cells 10 of the fuel cell stack 50 by simple application of some external force directly or via an adequate jig.

The structure of the second embodiment discussed above may be modified in various manners.

For example, in the structure of the fuel cell stack 50 of the second embodiment, the resin coating layers 11 and 12 are formed on the separators 6 and 7 to be bonded to the sealing layers 8. Alternatively resin coating layers may be formed on the sealing layers 8 to be bonded to the separators 6 and 7. The resin coating layers 11 and 12 may be omitted from the structure of the fuel cell stack 50, if not necessary. Like the modified example of the first embodiment shown in FIG. 5(*a*), resin coating layers 13 and 14 may be formed on the electrolyte membrane 3 of the MEA 2 to be bonded to the sealing layers 8. These modified structures ensure the similar functions and effects to those of the second embodiment discussed above.

The procedure of the second embodiment provides the identical fluids with those in the fluid supply for power generation of the fuel cell stack 50 to the respective conduits to facilitate disassembly of the fuel cell stack 50. One possible modification may provide a different fluid from those in the fluid supply for power generation to the respective conduits to facilitate disassembly of the fuel cell stack 50. For example, an organic solvent or a release agent having the function of dissolving or softening the sealing layers 8 and 56 may be heated or kept at room temperature and fed to the respective gas conduits 6g and 7g and the coolant conduits W. Available examples of the organic solvent include alcohols like methanol, ethanol, propanol, and butanol, ketones like acetone and methyl ethyl ketone, and esters like methyl acetate and ethyl acetate. Surface active agents may be used as the release agent. The in-passage pressure may be kept at a level equivalent to the specific level for power generation of the fuel cell stack 50, but is preferably heightened over the specific level for power generation to apply the forces in the directions of separating the sealing layers 8 and 56 from the separators 6 and 7.

Figure 15:
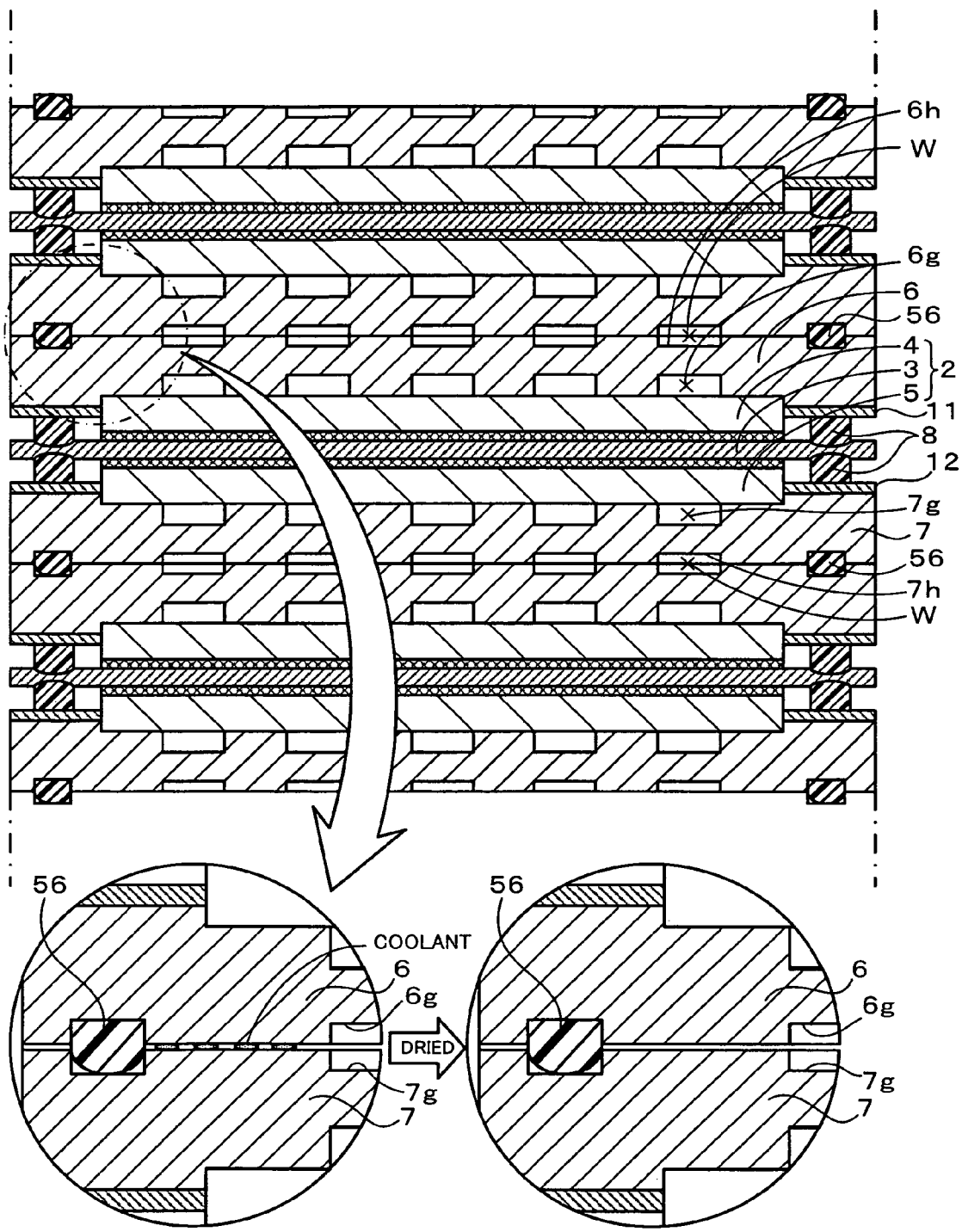
FIG. 15 is a sectional view of a fuel cell stack 50 in one modified structure of the second embodiment.

In the structure of the second embodiment, the coolant, for example, cooling water, is flowed through the coolant conduits W in the closed position of the pipe 60*f* in the process of disassembling the fuel cell stack 50. The coolant may be replaced by any suitable gas to be flowed through the coolant conduits W to heighten the in-passage pressure. In this modified structure, a preferable procedure makes a coolant removal gas, for example, the air of high temperature and low humidity, flow through the coolant conduits W in the open position of the pipe 60*f* to dry the coolant conduits W, closes the pipe 60*f*, and makes a suitable gas flow through the coolant conduits W to heighten the in-passage pressure. As shown in FIG. 15, the coolant entering the adhesion site between the rear faces of the separators 6 and 7 may function to heighten the adhesion force between the separators 6 and 7. The flow of the coolant removal gas evaporates or blows off the coolant at least partly for removal thereof and reduces this function. The dried coolant conduits W facilitate subsequent disassembly of the respective fuel cells 10 of the fuel cell stack 50 under the enhanced in-passage pressure of the coolant conduits W.

Figure 16:
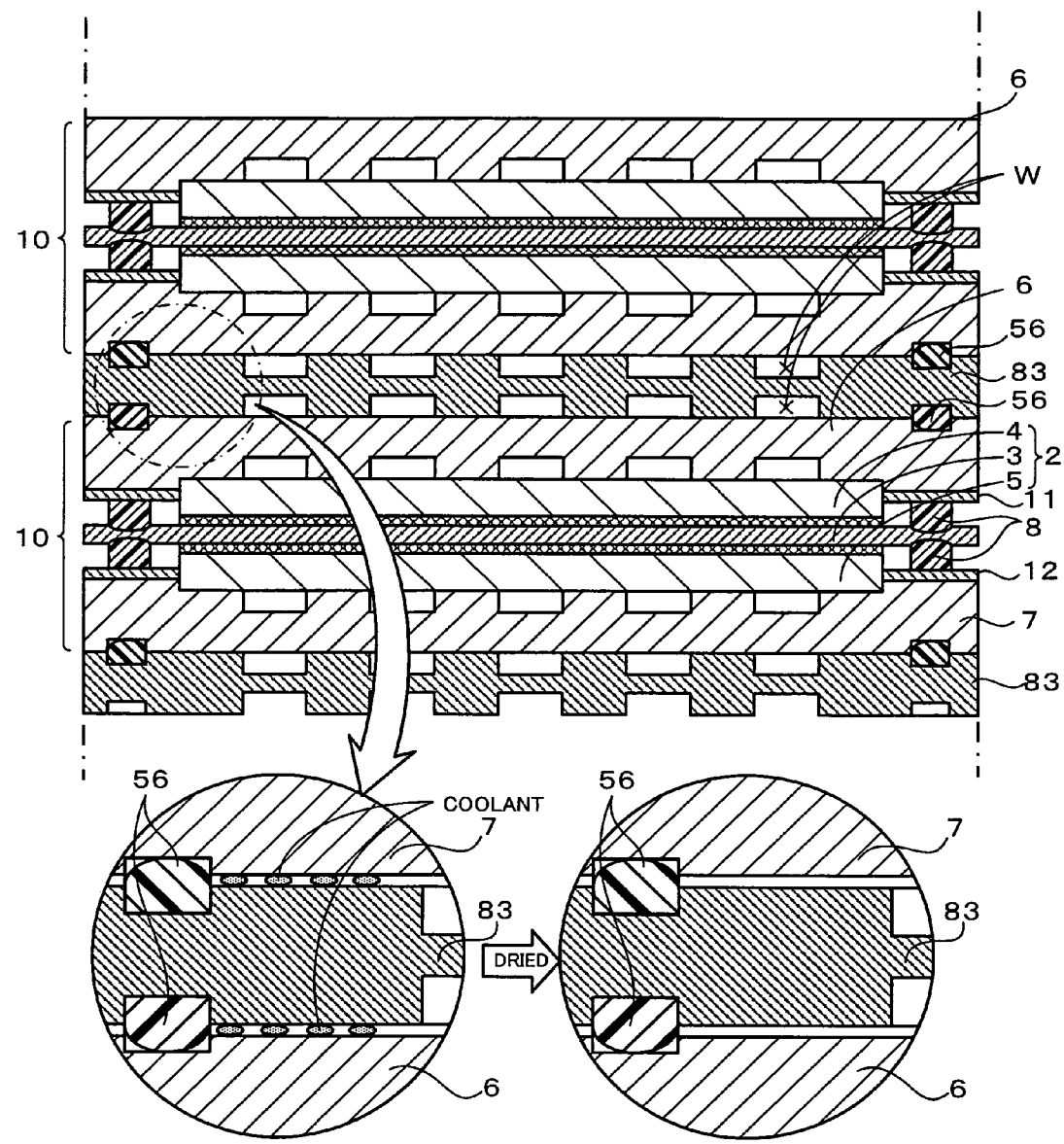
FIG. 16 is a sectional view of a fuel cell stack 50 in another modified structure.
Figure 17:
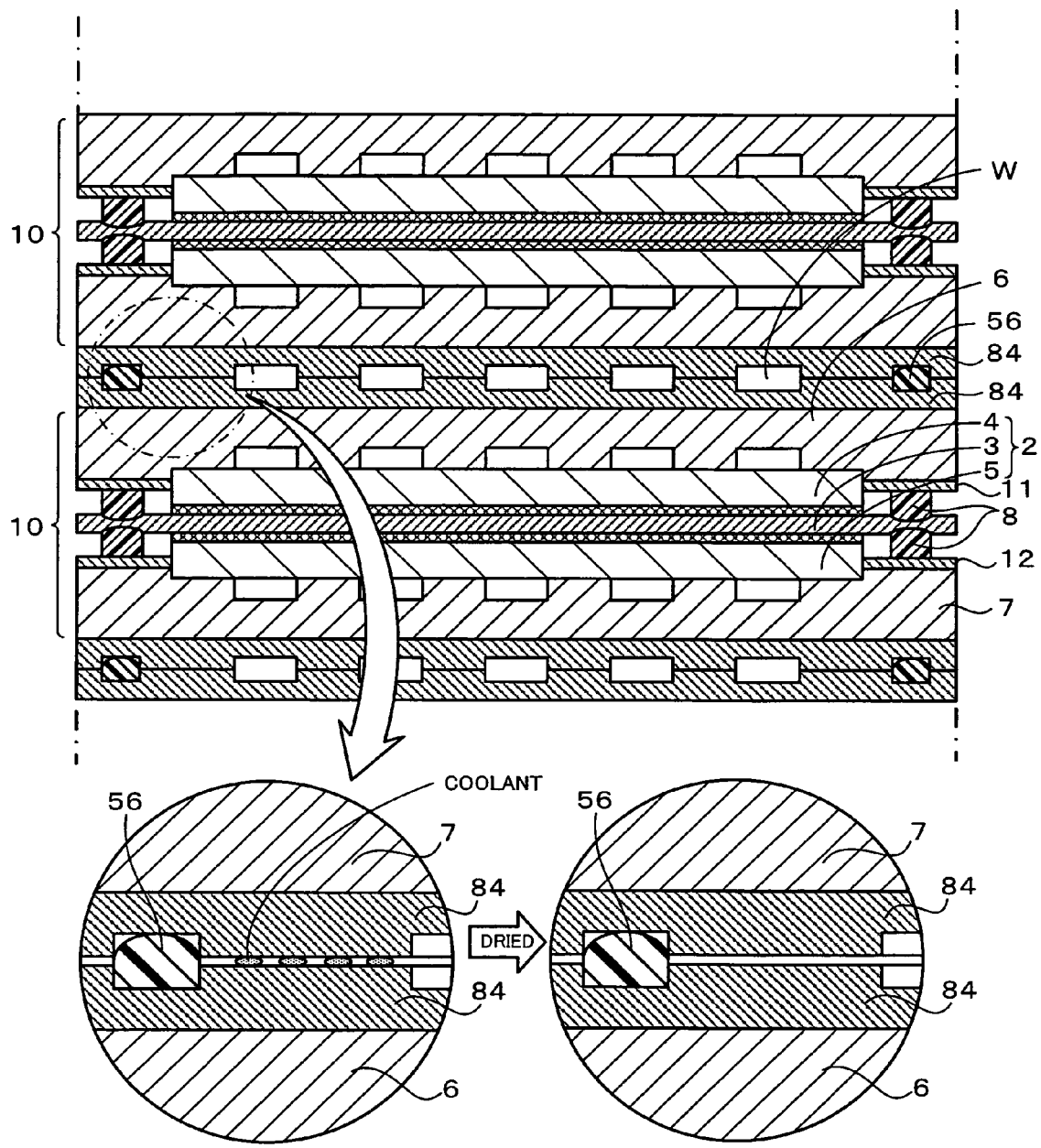
FIG. 17 is a sectional view of a fuel cell stack 50 in another modified structure.

The layout of the coolant conduits W is not restricted to the structure of the second embodiment. For example, the coolant conduits W may be formed between the separators 6 and 7 and a coolant conduit separator 83, which is located between the rear faces of the separators 6 and 7, as shown in FIG. 16. In this modified structure, the coolant removal gas is flowed to remove the coolant entering the spaces between the separators 6 and 7 and the coolant conduit separator 83. In another example, the coolant conduits W may be formed between a pair of coolant conduit separators 84, 84, which are located between the rear faces of the separators 6 and 7, as shown in FIG. 17. In this modified structure, the coolant removal gas is flowed to remove the coolant entering the space between the pair of coolant conduit separators 84, 84. In these modified structures of drying the coolant conduits W, the respective fuel cells 10 of the fuel cell stack 50 may readily be disassembled after the supply of the coolant removal gas without the enhanced in-passage pressure.

In the structure of the second embodiment, the pressing force F2 applied for disassembly of the fuel cell stack 50 is smaller than the pressing force F1 applied for power generation of the fuel cell stack 50. Another modified procedure may provide the identical fluids for disassembly of the fuel cell stack 50 with those in the fluid supply for power generation and keep the same level of in-passage pressure as the in-passage pressure during power generation, in order to reduce the contact areas of the sealing layers 8 with the separators 6 and 7 via the resin coating layers 11 and 12 and the contact areas of the sealing layer 56 with the separators 6 and 7 in each of the fuel cells 10 of the fuel cell stack 50.

The structure of the second embodiment may be modified to feed any of the above organic solvent and release agent, which has the function of dissolving or softening the sealing layers 8 and 56 and is heated or kept at room temperature, to the respective gas conduits 6g and 7g and the coolant conduits W for disassembly of the fuel cell stack 50. In this modified structure, the resin coating layers 11 and 12 may be omitted, if not necessary. The in-passage pressure may be kept at a level equivalent to the level for power generation of the fuel cell stack 50, but is preferably heightened over the level for power generation to apply the forces in the directions of separating the sealing layers 8 from the separators 6 and 7 and the sealing layers 56 from the separators 6 and 7 in the fuel cell stack 50.

The above embodiments regard the polymer electrolyte fuel cell and a stack structure of such polymer electrolyte fuel cells. The principle of the invention is also applicable to other types of fuel cells including solid oxide fuel cells, molten carbonate fuel cells, phosphoric acid fuel cells, and alkaline fuel cells. The sealing layers 8 and 56 formed by curing the adhesive in the structures of the first and the second embodiments discussed above may be replaced by gaskets. The adhesive and the gaskets may be made of, for example, a fluororesin or a silicone resin.

The procedure of the second embodiment lowers the pressing force F2 in the disassembly state than the pressing force F1 in the power generation state. One modified procedure may provide the fluid supply for disassembly of the fuel cell stack 50 under application of the same level of the pressing force F2 as the pressing force F1.

In the structure of the second embodiment, the coolant conduit forming concaves 6h and 7h are provided on the rear faces of both the separators 6 and 7 as shown in FIG. 12. One modified structure provides the coolant conduit forming concaves 7h only on the rear face of the separator 7 to form the coolant conduits W, while making the rear face of the separator 6 flat without concaves. Another modified structure provides the coolant conduit forming concaves 6h only on the rear face of the separator 6 to form the coolant conduits W, while making the rear face of the separator 7 flat without concaves. These modified structures ensure the similar functions and effects to those discussed in the second embodiment.

The embodiments and their modified examples discussed above are to be considered in all aspects as illustrative and not restrictive. There may be many other modifications, changes, and alterations without departing from the scope or spirit of the main characteristics of the present invention.

All changes within the meaning and range of equivalency of the claims are intended to be embraced therein. The scope and spirit of the present invention are indicated by the appended claims, rather than by the foregoing description.

INDUSTRIAL APPLICABILITY

The fuel cell of the invention is available as the power supply for automobiles, the power supply for domestic use, the power supply for business use, and the power supply for diverse electrical equipment.

The invention claimed is:

1. A fuel cell disassembly method of disassembling a fuel cell, the fuel cell comprising: an electrode assembly having an electrolyte interposed between a pair of electrodes; sealing layers located to surround a periphery of the electrode assembly; and a pair of separators arranged across the electrode assembly and bonded to the sealing layers, where one of the separators facing one of the electrodes has a fuel gas conduit, while the other of the separators facing the other of the electrodes has an oxidizing gas conduit, said fuel cell disassembly method comprising the step of:
supplying a specific fluid (which is referred to as a fluid supply for disassembly of the fuel cell) to at least one of the oxidizing gas conduit and the fuel gas conduit to facilitate separation of the electrode assembly from the pair of separators, wherein the fluid supply for disassembly of the fuel cell comprise one or more members selected from the group consisting of one or more organic solvents and water, wherein the specific fluid is supplied to heighten an in-passage pressure of at least one of the oxidizing gas conduit and the fuel gas conduit over a level of in-passage pressure level during power generation by the fuel cell, and wherein the specific fluid has a function of lowering an adhesive force of the sealing layers.

2. A fuel cell disassembly method in accordance with claim 1, wherein the specific fluid having the function of lowering the adhesive force of the sealing layers is different from a fluid supplied for power generation of the fuel cell.

3. A fuel cell disassembly method in accordance with claim 1, wherein the fluid supply for disassembly of the fuel cell is carried out to supply a fluid to both of the fuel gas conduit and the oxidizing gas conduit.

4. A fuel cell disassembly method in accordance with claim 1, wherein the separator is kept pressing or surrounded during the fluid supply for disassembly of the fuel cell.

5. A fuel cell disassembly method in accordance with claim 1, wherein the specific fluid having the function of lowering the adhesive force of the sealing layers is either water or an organic solvent, which is different from a fluid supplied for power generation of the fuel cell.

6. A fuel cell disassembly method in accordance with claim 1, wherein the specific fluid having the function of lowering the adhesive force of the sealing layers has a higher temperature than a temperature of a fluid supplied for power generation of the fuel cell.

7. A fuel cell disassembly method in accordance with claim 1, wherein an external force is additionally applied in directions of parting the pair of separators from each other during the fluid supply for disassembly of the fuel cell.

8. A fuel cell disassembly method in accordance with claim 1, said fuel cell disassembly method further comprising the step of:
weakening a pressing force applied in a direction of making the pair of separators approach to each other during power generation of the fuel cell, prior to said step of providing the fluid supply for disassembly of the fuel cell.

9. A fuel cell disassembly method in accordance with claim 1, wherein said fluid supplying step supplies the specific fluid to facilitate separation of the electrode assembly from the pair of separators included in either a fuel cell stack or a fuel cell module, which is a layered body of plurality of the fuel cells.

10. A fuel cell disassembly method that disassembles a layered body of multiple fuel cells having a coolant sealing layer, which prevents leakage of a coolant from a coolant conduit formed either between adhesion faces of each pair of adjoining fuel cells or between adhesion faces of each fuel cell and each coolant conduit separator, said fuel cell disassembly method comprising:
a coolant removal step of supplying a fluid to the coolant conduit in the course of disassembly of the fuel cells of the layered body to remove at least part of the coolant from a space between the adhesion faces of each pair of adjoining fuel cells or from a space between the adhesion forces of each fuel cell and each coolant conduit separator, and
a fluid supply step after the coolant removal step,
the fluid supply step supplying a fluid supply for disassembly of the fuel cell to at least one of the oxidizing gas conduit and the fuel gas conduit formed in the layered body of the fuel cells to facilitate disassembly of at least part of the fuel cells of the layered body,
wherein the fluid supply for disassembly of the fuel cell comprises one or more members selected from the group consisting of one or more organic solvents and water, wherein the fluid supply for disassembly of the fuel cell is supplied to heighten an in-passage pressure of at least one of the oxidizing gas conduit and the fuel gas conduit over a level of in-passage pressure during power generation by the layered body of the fuel cells and the fluid supply for disassembly of the fuel cell has a function of lowering an adhesive force of the coolant sealing layer, supplying a specific fluid (which is referred to as a fluid supply for disassembly of the fuel cell) to at least one of the oxidizing gas conduit and the fuel gas conduit to facilitate separation of the electrode assembly from the pair of separators, wherein the fluid supply for disassembly of the fuel cell comprise one of more members selected from the group consisting of one or more organic solvents and water, wherein the specific fluid is supplied to heighten an in-passage pressure of at least one of the oxidizing gas conduit and the fuel gas conduit over a level of in-passage pressure level during power generation by the fuel cell, and wherein the specific fluid has a function of lowering an adhesive force of the sealing layers.

11. A fuel cell that generates electric power through reaction of a fuel gas with an oxidizing gas, said fuel cell comprising:

an electrode assembly having an electrolyte interposed between a pair of electrodes;

sealing layers located to surround a periphery of the electrode assembly;

a pair of separators arranged across the electrode assembly and bonded to the sealing layers, where one of the separators facing one of the electrodes has a fuel gas conduit, while the other of the separators facing the other of the electrodes has an oxidizing gas conduit, and a breaking guide that is formed in each of the separators to function as a starting point of breakage of the separator triggered by a fluid supply for disassembly of said fuel cell to supply a fluid to at least one of the fuel gas conduit and the oxidizing gas conduit to heighten an in-passage pressure of at least one of the oxidizing gas conduit and the fuel gas conduit over a level of in-passage pressure level during power generation by the fuel cell, wherein at least either boundaries between the sealing layers and the separators or boundaries between the sealing layers and the electrode assembly are made of a functional material having an adhesion force that is lowered by a fluid supply to at least one of the fuel gas conduit and the oxidizing gas conduit for disassembly of the fuel cell, wherein the fluid supply is a fluid supply for disassembly of the fuel cell different from a power generation fluid supply of said fuel cell, and wherein the fluid supply for disassembly of the fuel cell comprises one or more members selected from the group consisting of one or more organic solvents and water.

12. A fuel cell in accordance with claim 11, wherein the functional material has a characteristic of lowering the adhesion force in a preset high temperature range.

13. A fuel cell in accordance with claim 11, wherein the functional material has a characteristic of lowering the adhesion force, when being exposed to hot water.

14. A fuel cell in accordance with claim 11, wherein the functional material has a characteristic of lowering the adhesion force, when being exposed to either of an organic solvent or a release agent.

15. A fuel cell in accordance with claim 11, wherein the sealing layers are made of the functional material.

16. A fuel cell that generated electric power through a reaction of a fuel gas with an oxidizing gas, said fuel cell comprising:

an electrode assembly having an electrolyte interposed between a pair of electrodes;

sealing layers located to surround a periphery of the electrode assembly;

a pair of separators arranged across the electrode assembly and bonded to the sealing layers, where one of the separators facing one of the electrodes has a fuel gas conduit, while the other of the separators facing the other of the electrodes has an oxidizing gas conduit, and a breaking guide that is formed in each of the separators to function as a starting point of breakage of the separator triggered by a fluid supply for disassembly of said fuel cell to supply a fluid to at least one of the fuel gas conduit and the oxidizing gas conduit to heighten an in-passage pressure of at least one of the oxidizing gas conduit and the fuel gas conduit over a level of in-passage pressure level during power generation by the fuel cell, wherein the fluid supply for disassembly of the fuel cell comprises one or more members selected from the group consisting of one or more organic solvents and water.

17. A fuel cell in accordance with claim 16, wherein the breaking guide is formed in each of the separators to function as a starting point of breakage of the separator triggered by the fluid supply for disassembly of said fuel cell, which is different from a fluid supply for power generation of said fuel cell, to supply a fluid to at least one of the fuel gas conduit and the oxidizing gas conduit.

* * * * *